United States Patent
Mick et al.

(10) Patent No.: US 10,210,567 B2
(45) Date of Patent: Feb. 19, 2019

(54) MARKET-BASED VIRTUAL MACHINE ALLOCATION

(71) Applicant: Rackspace US, Inc., San Antonio, TX (US)

(72) Inventors: Jason Mick, Converse, TX (US); Dale Lee Bracey, San Antonio, TX (US); Van Lindberg, Murphy, TX (US)

(73) Assignee: Rackspace US, Inc., San Antonio, TX (US)

( * ) Notice: Subject to any disclaimer, the term of this patent is extended or adjusted under 35 U.S.C. 154(b) by 521 days.

(21) Appl. No.: 14/703,642

(22) Filed: May 4, 2015

(65) Prior Publication Data

US 2015/0235308 A1 Aug. 20, 2015

Related U.S. Application Data

(63) Continuation of application No. 13/747,340, filed on Jan. 22, 2013, now Pat. No. 9,027,024, which is a
(Continued)

(51) Int. Cl.
*G06F 9/455* (2018.01)
*G06Q 30/08* (2012.01)
(Continued)

(52) U.S. Cl.
CPC ......... *G06Q 30/08* (2013.01); *H04L 41/5054* (2013.01); *H04L 47/783* (2013.01); *H04L 67/10* (2013.01); *H04L 67/16* (2013.01)

(58) Field of Classification Search
CPC .................................................. G06F 9/45533
(Continued)

(56) References Cited

U.S. PATENT DOCUMENTS 6,032,044 A 2/2000 Shannon et al.
6,446,092 B1 9/2002 Sutter
(Continued)

FOREIGN PATENT DOCUMENTS

EP 2239866 10/2010

OTHER PUBLICATIONS

International Search Report and Written Opinion issued for PCT/US2013/029274 dated Jun. 21, 2013, 12 pages.
(Continued)

*Primary Examiner* — Mehran Kamran
(74) *Attorney, Agent, or Firm* — Haynes and Boone, LLP

(57) ABSTRACT

A cloud computing system management system including a plurality of computing devices configured to host virtual machine instances, each computing device in the plurality of computing devices including a local agent that continuously evaluates the observed load relative to a utility maximization function. If observed load is higher than a calculated optimal level, individual loading processes are offered for "sale" via a market scheduler. If observed load is lower than a calculated optimal level, then available capacity is offered as a bid via the market scheduler. The market scheduler matches bids with available processes and coordinates the transfer of load from the selling device to the buying device. The offered prices and utility maximization functions can be employed to optimize the performance of the cloud system as a whole.

20 Claims, 17 Drawing Sheets

Related U.S. Application Data continuation-in-part of application No. 13/467,686, filed on May 9, 2012, now Pat. No. 9,268,586.

(51) Int. Cl.
  *H04L 12/24* (2006.01)
  *H04L 12/911* (2013.01)
  *H04L 29/08* (2006.01)

(58) Field of Classification Search
  USPC .......................................................... 718/1
  See application file for complete search history.

(56) References Cited

U.S. PATENT DOCUMENTS

| | | | |
|---|---|---|---|
| 6,795,966 | B1 | 9/2004 | Lim et al. |
| 6,917,963 | B1 | 7/2005 | Hipp et al. |
| 7,093,086 | B1 | 8/2006 | Van Rietschote |
| 7,552,279 | B1 | 6/2009 | Gandler |
| 7,577,722 | B1* | 8/2009 | Khandekar ......... G06F 9/45558 709/220 |
| 7,594,018 | B2* | 9/2009 | Pedersen ................ H04L 63/08 709/227 |
| 7,634,430 | B2 | 12/2009 | Huberman et al. |
| 8,015,383 | B2 | 9/2011 | Schultz et al. |
| 8,364,639 | B1 | 1/2013 | Koryakina et al. |
| 8,438,216 | B2 | 5/2013 | Runcie et al. |
| 8,458,717 | B1 | 6/2013 | Keagy et al. |
| 8,538,919 | B1 | 9/2013 | Neilsen et al. |
| 9,098,214 | B1* | 8/2015 | Vincent ................. G06F 9/4856 |
| 2005/0102393 | A1* | 5/2005 | Murray .................. H04L 29/06 709/224 |
| 2005/0138310 | A1 | 6/2005 | Horiuchi |
| 2005/0268298 | A1 | 12/2005 | Hunt et al. |
| 2006/0005189 | A1 | 1/2006 | Vega et al. |
| 2006/0122927 | A1* | 6/2006 | Huberman ............ G06F 9/5005 705/37 |
| 2006/0167703 | A1* | 7/2006 | Yakov .................. B23K 1/0016 705/26.1 |
| 2007/0006226 | A1 | 1/2007 | Hendel |
| 2007/0094467 | A1 | 4/2007 | Yamasaki |
| 2007/0171921 | A1 | 7/2007 | Wookey et al. |
| 2007/0174410 | A1 | 7/2007 | Croft et al. |
| 2007/0174429 | A1 | 7/2007 | Mazzaferri et al. |
| 2007/0226320 | A1 | 9/2007 | Hager et al. |
| 2008/0005297 | A1 | 1/2008 | Kjos et al. |
| 2008/0052322 | A1 | 2/2008 | Gusciora |
| 2008/0126547 | A1* | 5/2008 | Waldspurger ......... G06F 9/4881 709/226 |
| 2008/0222375 | A1 | 9/2008 | Kotsovinos et al. |
| 2008/0244607 | A1* | 10/2008 | Rysin .................... G06Q 30/06 718/104 |
| 2008/0301688 | A1* | 12/2008 | Boss ..................... G06Q 10/06 718/104 |
| 2009/0037680 | A1 | 2/2009 | Colbert et al. |
| 2009/0063241 | A1* | 3/2009 | Wilkes .............. G06Q 10/06314 705/7.21 |
| 2009/0228532 | A1 | 9/2009 | Anzai |
| 2009/0313445 | A1 | 12/2009 | Pandey et al. |
| 2010/0082922 | A1 | 4/2010 | George et al. |
| 2010/0094948 | A1 | 4/2010 | Ganesh et al. |
| 2010/0103781 | A1 | 4/2010 | Rai et al. |
| 2010/0107173 | A1* | 4/2010 | Chassin ................ G06Q 20/102 718/104 |
| 2010/0131649 | A1* | 5/2010 | Ferris ................... G06F 9/5072 709/226 |
| 2010/0180278 | A1* | 7/2010 | Yoshida ................. G06F 9/505 718/103 |
| 2010/0217866 | A1* | 8/2010 | Nandagopal ........ H04L 67/1029 709/226 |
| 2010/0306354 | A1* | 12/2010 | DeHaan ................ G06F 1/3203 709/222 |
| 2010/0318454 | A1* | 12/2010 | Warncke ................ G06Q 40/04 705/37 |
| 2010/0325261 | A1* | 12/2010 | Radhakrishnan ..... G06F 15/173 709/224 |
| 2011/0153697 | A1* | 6/2011 | Nickolov .............. G06F 9/4856 707/827 |
| 2011/0154353 | A1* | 6/2011 | Theroux ................ G06F 9/5038 718/104 |
| 2011/0264939 | A1* | 10/2011 | Wong .................... G06F 1/3203 713/323 |
| 2012/0054306 | A1 | 3/2012 | Vaghani et al. |
| 2012/0084381 | A1 | 4/2012 | Alladi et al. |
| 2012/0131591 | A1* | 5/2012 | Moorthi ................ G06Q 10/06 718/104 |
| 2012/0233331 | A1* | 9/2012 | Voccio ................ G06F 9/45558 709/226 |
| 2012/0272244 | A1* | 10/2012 | Bozek ..................... G06F 9/461 718/1 |
| 2012/0317579 | A1* | 12/2012 | Liu ....................... G06F 11/1438 718/104 |
| 2013/0031028 | A1* | 1/2013 | Martin .................. G06Q 30/08 705/400 |
| 2013/0166340 | A1* | 6/2013 | Salame ................. G06Q 30/08 705/7.14 |
| 2013/0174149 | A1* | 7/2013 | Dasgupta ............... G06F 9/5077 718/1 |
| 2013/0283266 | A1* | 10/2013 | Baset ..................... G06F 9/485 718/1 |
| 2013/0304903 | A1* | 11/2013 | Mick ................... H04L 43/0817 709/224 |
| 2014/0067496 | A1* | 3/2014 | Buswell ................ G06Q 30/08 705/14.4 |
| 2014/0298338 | A1* | 10/2014 | Doi ....................... G06F 9/4856 718/1 |

OTHER PUBLICATIONS

LLorenta et al., "Cloud Computing for on-Demand Grid Resource Provisioning," High Speed and Large Scale Scientific Computing, IOS Press Jan. 1, 2009, pp. 177-191.

Crago et al., "Heterogeneous Cloud Computing," 2011 IEEE International Conference on Cluster Computing, Sep. 26, 2011, pp. 378-385.

Cordeiro et al., "Open Source Cloud Computing Platforms," 2010 Ninth International Conference on Grid and Cloud Computing, Nov. 1, 2010, pp. 366-371.

European Search Report received in European Application No. 12001564.9, dated Nov. 28, 2012, 5 pages.

Malone, Thomas W., et al., "Enterprise: A Market-Like Task Scheduler for Distributed Computing Environments," Oct. 1983, CISR WP#111, Sloan WP #1537-84, Cambridge, MA, 46 pages.

Miller, Mark S., et al., "Markets and Computation: Agoric Open Systems;" *The Ecology of Computation* (Huberman, ed.), Elsevier Science Publishers/North-Holland, 1988, 38 pages.

Miller, Mark S., et al., "Incentive Engineering: for Computational Resource Management," *The Ecology of Computation* (Huberman, ed.), Elsevier Science Publishers/North-Holland, 1988, 46 pages.

Miller, Mark S., et al., "Comparative Ecology: A Computational Perspective," *The Ecology of Computation* (Huberman, ed.), Elsevier Science Publishers/North-Holland, 1988, 34 pages.

Kurose, James F., et al., "A Microeconomic Approach to Optimal Resource Allocation in Distributed Computer Systems," IEEE Transactions on Computers, vol. 38, No. 5, May 1989, p. 705-717.

Waldspurger, Carl A., et al., "Spawn: A Distributed Computational Economy," IEEE Transactions on Software Engineering, vol. 18, No. 2, Feb. 1992, p. 103-117.

Wellman, Michael P., "A Market-Oriented Programming Environment and Its Application to Distributed Multicommodity flow Problems," Journal of Artificial intelligence Research 1, (1993), Aug. 1993, p. 1-23.

Stonebraker, Michael, et al., "An Economic Paradigm for Query Processing and Data Migration in Mariposa," University of California, Berkeley, 1994, 10 pages.

Messer, Alan, et al., "A Market Model for Resource Allocation in Distributed Operating Systems," Systems Architecture Research Center, London, UK, 1995, 12 pages.

(56) References Cited

OTHER PUBLICATIONS

Cliff, Dave, "Minimal-Intelligence Agents for Bargaining Behaviors in Market-Based Environments," University of Sussex, Brighton, UK, Jun. 1997, 134 pages.

Chun, Brent N., et al., "Market-based Proportional Resources Sharing for Clusters," University of California, Berkeley, 1999, 19 pages.

Wolski, Rich, et al., "Analyzing Market-based Resource Allocation Strategies for the Computational Grid," University of Tennessee and College of the Holy Cross, Knoxville, 2001, 26 pages.

Chun, Brent Nee, "Market-based Cluster Resource Management," dissertation for Ph.D. requirements, University of California, Berkeley, Fall 2001, 191 pages.

He, Linli, et al., "Forming Resource-Sharing Coalitions: a Distributed Resource Allocation Mechanism for Self-Interested Agents in Computational Grids," ACM Symposium on Applied Computing, Mar. 13-17, 2005, Santa Fe, NM, 1-58113-964-0/05/0003, p. 84-91.

Buyya, Rajkumar, et al., "Market-Oriented cloud Computing: Vision, Hype, and Reality for Delivering IT Services as computing Utilities," GRIDS Laboratory, University of Melbourne, Australia, 2008 9 pages.

Lai, Kevin, et al., "Tycoon: a Distributed Market-based Resource Allocation System," HP Labs, Feb. 1, 2008, arXiv:cs/0404013v1 [cs.DC] Apr. 5, 2004, 8 pages.

An, Bo, et al., "Automated Negotiation with Decommitment for Dynamic Resource Allocation in Cloud Computing," University of Massachusetts, Amherst, p. 981-988.

Stober, Jochen, et al., "Market-Based Pricing in Grids: On Strategic Manipulation and Computational Cost," Karlsruhe Institute of Technology, Universitat Karlsruhe and Albert-Ludwigs-Universitat Freiberg, Germany, 2010, 31 pages.

Niyato, Dusit, et al., "Cooperative Virtual Machine Management for Multi-Organization Cloud Computing Environment," Nanyang Technological University, Singapore, 2011, p. 528-537.

Zhou, Songnian, et al., "Utopia: A Load Sharing Facility for Large, Heterogeneous Distributed Computer Systems," Technical Report CSRI-257, Apr. 1992, Toronto, Canada, 37 pages.

Wang, Tengjiao, et al., "MBA: A market-based Approach to Data Allocation and Dynamic Migration for Cloud Database," Science China, Jan. 2010 vol. 53, No. 1: 1-18.

Clark et al, "Live Migration of Virtual Machine," USENIX Association, NSDI'05: $2^{nd}$ Symposium on Networked Systems Design & Implementation, p. 273-286.

Jianhua, Gu, et al, "A New Resource Scheduling Strategy Based on Genetic Algorithm in Cloud Computing Environment." Dec. 2, 2013, Journal of Computers 7.1 (2012): 42-52, Computers & Applied Sciences Complete.

Yichao, Yang, et al, "Heuristic Scheduling Algorithms for Allocation of Virtualized Network and Computing Resources." Journal of Software Engineering & Applications 6.1 (2013): 1-13, Dec. 2, 2013, Computers & Applied Sciences Complete.

Chen, Xiaojun, Jing Zhang, and Junhuai Li. "A Methodology for Task Placement and Scheduling Based on Virtual Machine," KSII Transactions On Internet & Information Systems 5.9 (2011): 1544-1571, Dec. 2, 2013, Computers & Applied Sciences Complete.

Steinder, Malgorzata, et al. "Server Virtualization in Autonomic Management of Heterogeneous Workloads," Integrated Network Management, 2007. IM'07. $10^{th}$ IFIP/IEEE International Symposium on IEEE, 2007.

International Search Report and Written Opinion issued for PCT/US2014/012514 dated Jun. 4, 2014, 12 pages.

\* cited by examiner

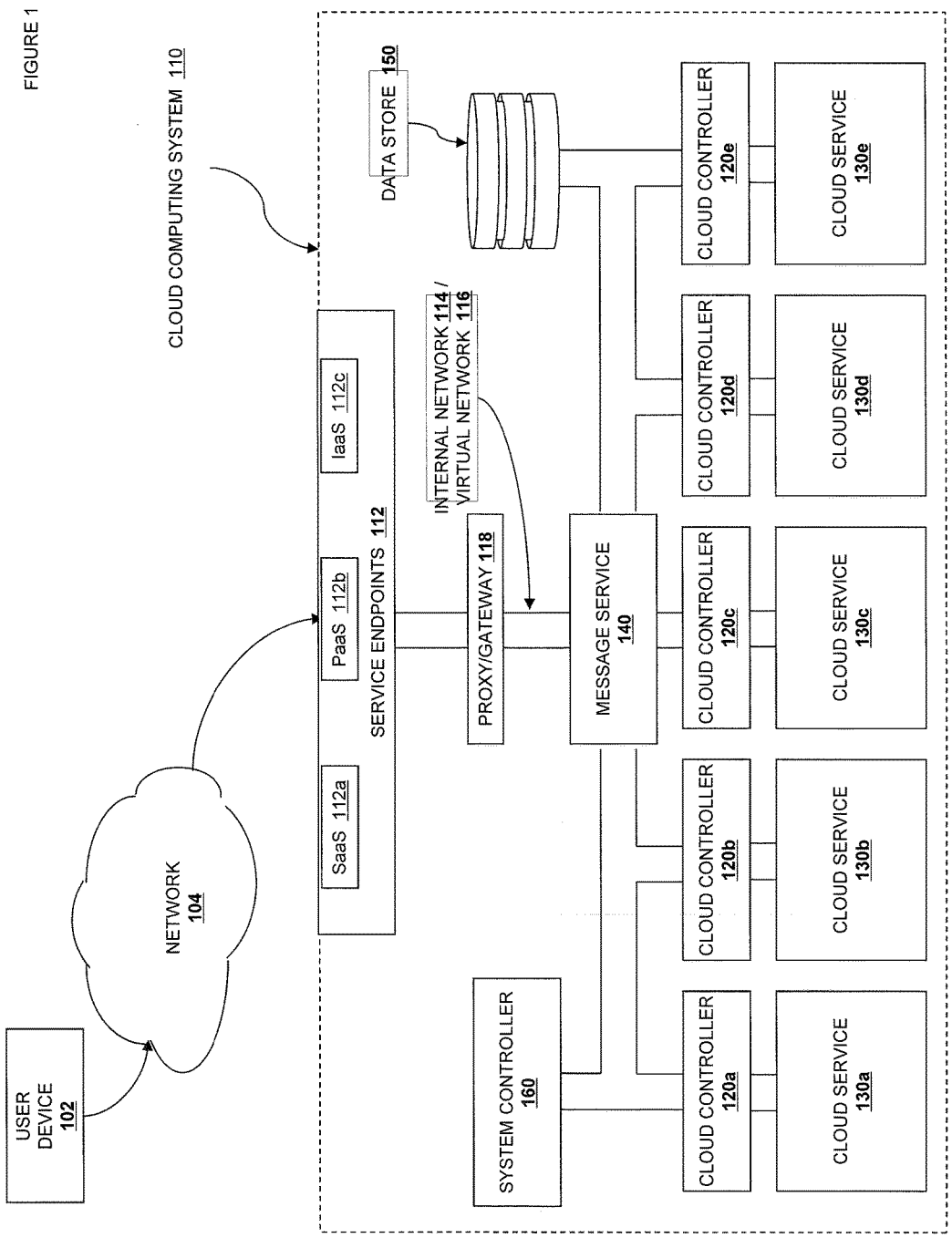

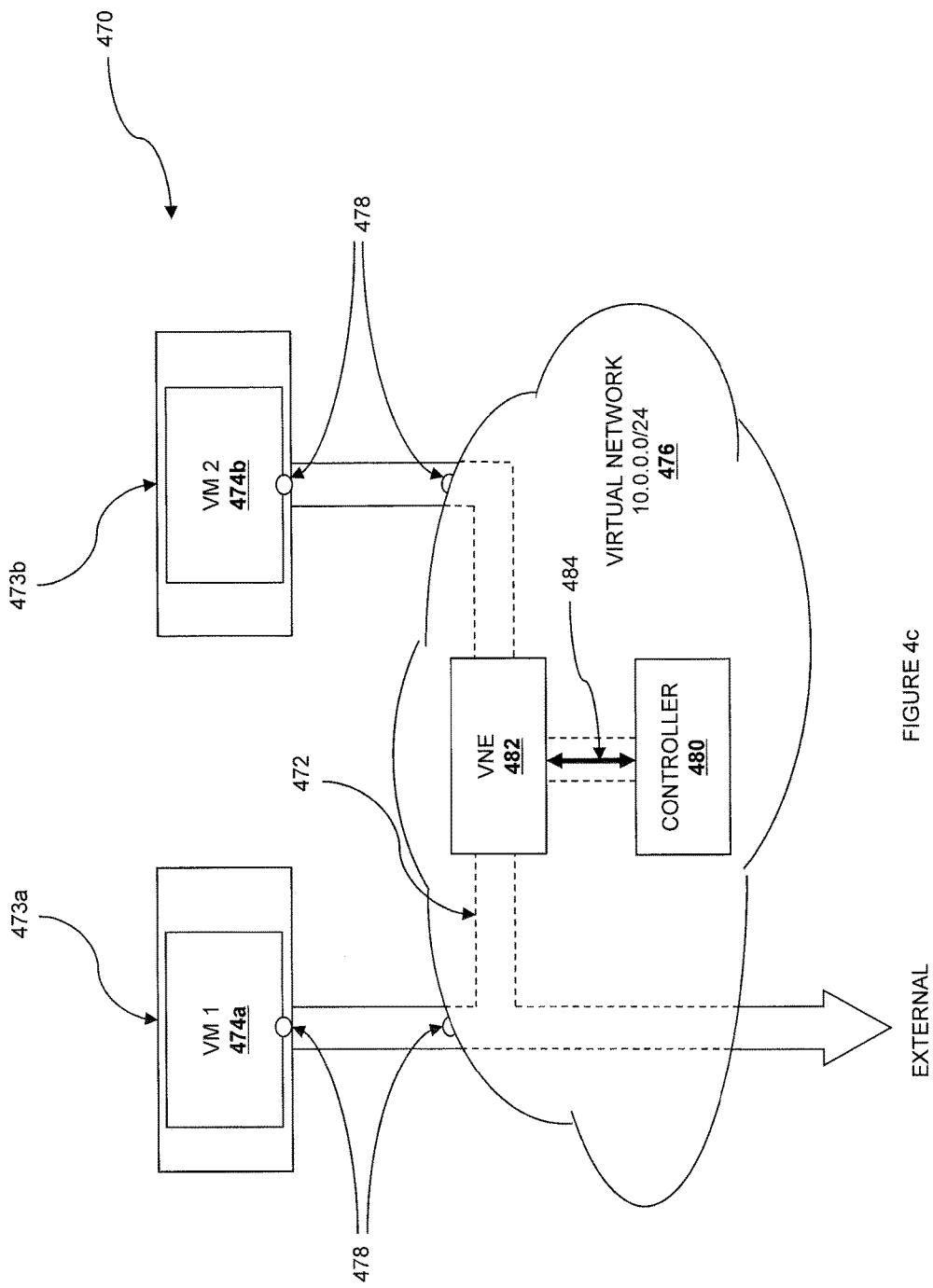

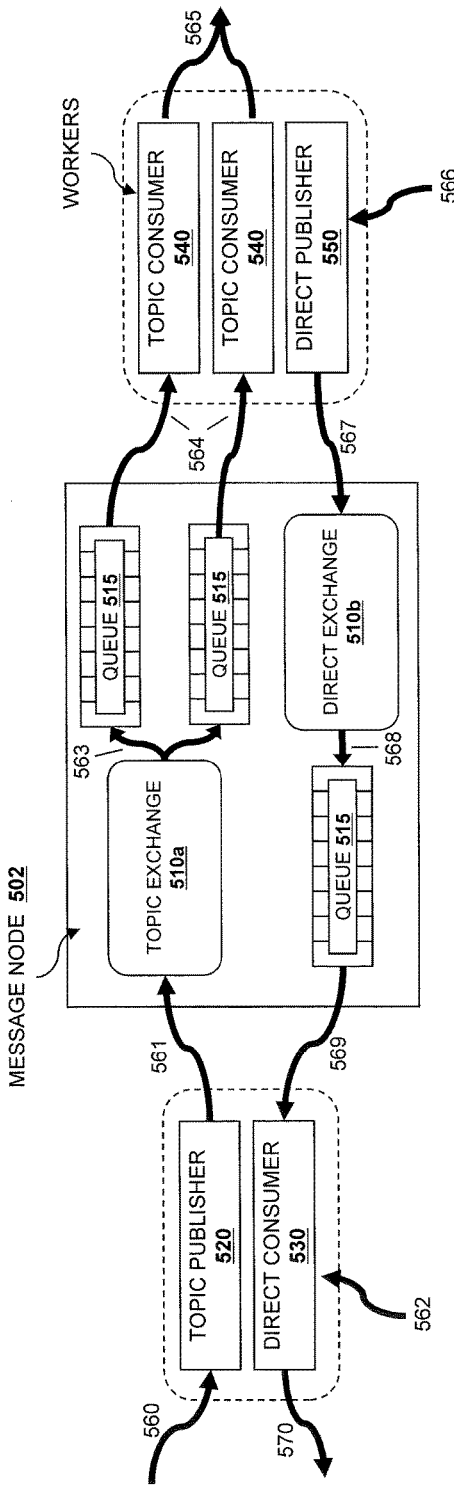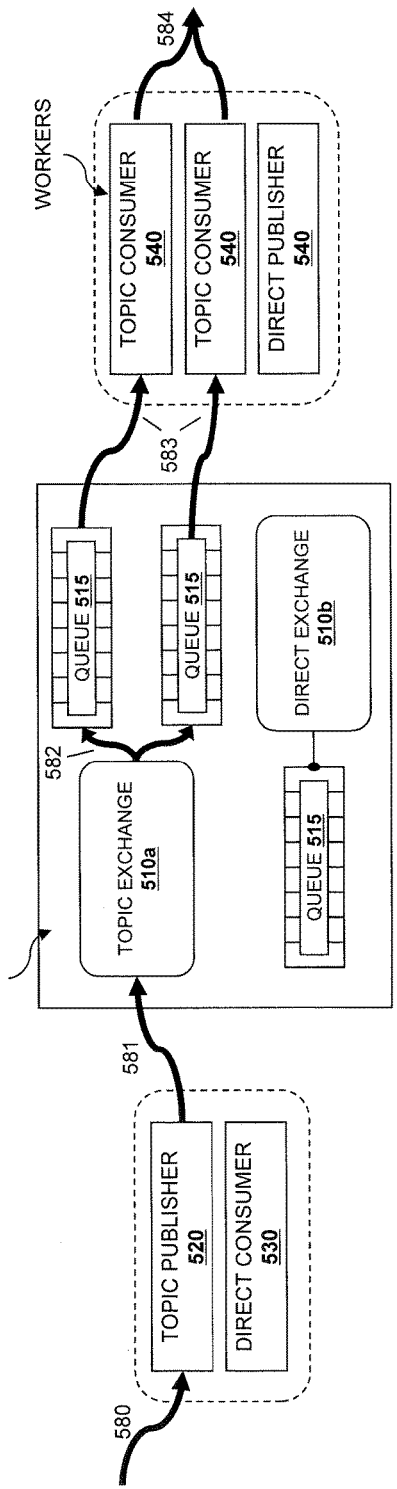
FIGURE 5b
FIGURE 5c

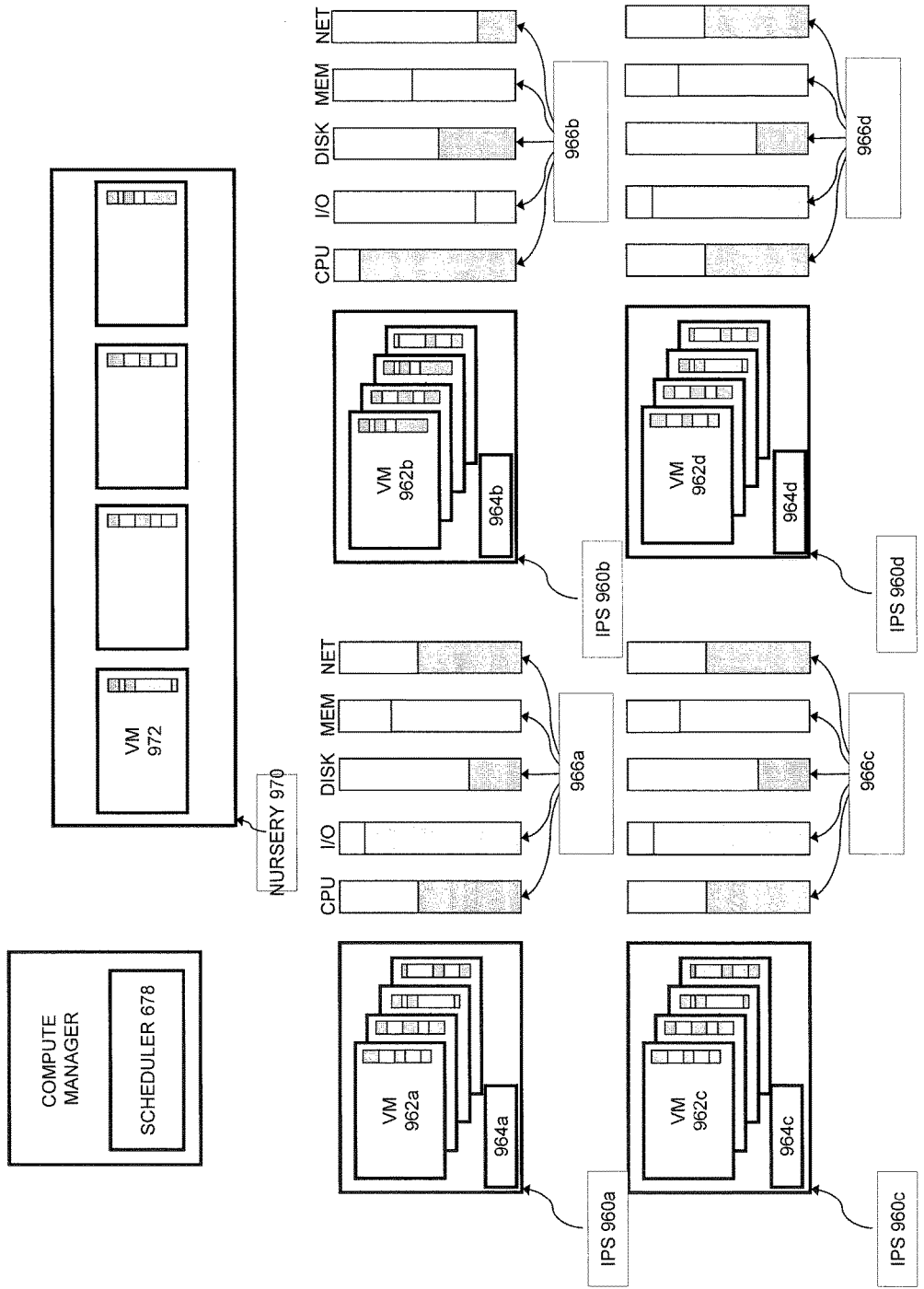

MARKET-BASED VIRTUAL MACHINE ALLOCATION

CROSS REFERENCE TO RELATED APPLICATIONS

This application is a continuation of U.S. application Ser. No. 13/747,340, filed Jan. 22, 2013, which is a continuation-in-part of U.S. application Ser. No. 13/467,686, filed May 9, 2012, entitled "Wake-on-LAN and Instantiate-on-LAN in a Cloud Computing System," and is related to application Ser. No. 13/491,866, filed Jun. 8, 2012, entitled "System and Method for Metadata Discovery and Metadata-Aware Scheduling," which are each incorporated by reference in their entirety herein.

BACKGROUND

The present disclosure relates generally to cloud computing, and more particularly to a more efficient and scalable method for utilizing the scarce resources in a cloud computing system.

Cloud computing services can provide computational capacity, data access, networking/routing and storage services via a large pool of shared resources operated by a cloud computing provider. Because the computing resources are delivered over a network, cloud computing is location-independent computing, with all resources being provided to end-users on demand with control of the physical resources separated from control of the computing resources.

Originally the term cloud came from a diagram that contained a cloud-like shape to contain the services that afforded computing power that was harnessed to get work done. Much like the electrical power we receive each day, cloud computing is a model for enabling access to a shared collection of computing resources—networks for transfer, servers for storage, and applications or services for completing work. More specifically, the term "cloud computing" describes a consumption and delivery model for IT services based on the Internet, and it typically involves over-the-Internet provisioning of dynamically scalable and often virtualized resources. This frequently takes the form of web-based tools or applications that users can access and use through a web browser as if it was a program installed locally on their own computer. Details are abstracted from consumers, who no longer have need for expertise in, or control over, the technology infrastructure "in the cloud" that supports them. Most cloud computing infrastructures consist of services delivered through common centers and built on servers. Clouds often appear as single points of access for consumers' computing needs, and do not require end-user knowledge of the physical location and configuration of the system that delivers the services.

The utility model of cloud computing is useful because many of the computers in place in data centers today are underutilized in computing power and networking bandwidth. People may briefly need a large amount of computing capacity to complete a computation for example, but may not need the computing power once the computation is done. The cloud computing utility model provides computing resources on an on-demand basis with the flexibility to bring it up or down through automation or with little intervention.

As a result of the utility model of cloud computing, there are a number of aspects of cloud-based systems that can present challenges to existing application infrastructure. First, clouds should enable self-service, so that users can provision servers and networks with little human intervention. Second, network access is necessary. Because computational resources are delivered over the network, the individual service endpoints need to be network-addressable over standard protocols and through standardized mechanisms. Third, multi-tenancy. Clouds are designed to serve multiple consumers according to demand, and it is important that resources be shared fairly and that individual users not suffer performance degradation. Fourth, elasticity. Clouds are designed for rapid creation and destruction of computing resources, typically based upon virtual containers. Provisioning these different types of resources must be rapid and scale up or down based on need. Further, the cloud itself as well as applications that use cloud computing resources must be prepared for impermanent, fungible resources; application or cloud state must be explicitly managed because there is no guaranteed permanence of the infrastructure. Fifth, clouds typically provide metered or measured service—like utilities that are paid for by the hour, clouds should optimize resource use and control it for the level of service or type of servers such as storage or processing.

Cloud computing offers different service models depending on the capabilities a consumer may require, including SaaS, PaaS, and IaaS-style clouds. SaaS (Software as a Service) clouds provide the users the ability to use software over the network and on a distributed basis. SaaS clouds typically do not expose any of the underlying cloud infrastructure to the user. PaaS (Platform as a Service) clouds provide users the ability to deploy applications through a programming language or tools supported by the cloud platform provider. Users interact with the cloud through standardized APIs, but the actual cloud mechanisms are abstracted away. Finally, IaaS (Infrastructure as a Service) clouds provide computer resources that mimic physical resources, such as computer instances, network connections, and storage devices. The actual scaling of the instances may be hidden from the developer, but users are required to control the scaling infrastructure.

One way in which different cloud computing systems may differ from each other is in how they deal with control of the underlying hardware and privacy of data. The different approaches are sometimes referred to a "public clouds," "private clouds," "hybrid clouds," and "multi-vendor clouds." A public cloud has an infrastructure that is available to the general public or a large industry group and is likely owned by a cloud services company. A private cloud operates for a single organization, but can be managed on-premise or off-premise. A hybrid cloud can be a deployment model, as a composition of both public and private clouds, or a hybrid model for cloud computing may involve both virtual and physical servers. A multi-vendor cloud is a hybrid cloud that may involve multiple public clouds, multiple private clouds, or some mixture.

Because the flow of services provided by the cloud is not directly under the control of the cloud computing provider, cloud computing requires the rapid and dynamic creation and destruction of computational units, frequently realized as virtualized resources. Maintaining the reliable flow and delivery of dynamically changing computational resources on top of a pool of limited and less-reliable physical servers provides unique challenges.

The typical way in which resources are allocated uses a "scheduler," a controller that performs a function similar to a scheduler in an operating system. An operating system scheduler balances the competing demands for resources and allocates access to scarce resources such as CPU time, physical memory, virtual memory, disk accesses, disk space, or processes. In a cloud computing context, the scheduler allocates resources such as network capacity, disk capacity, disk activity on hosts, physical CPU time on hosts, and latency to identify a "best" physical host on which to situate a virtual machine (or other virtual resource). Sometimes the schedulers use randomness to achieve a probabilistic spread of load across the physical resources. Other schedulers use a pre-set spreading rule that achieves a particular desired distribution of work. A third type of schedulers is adaptive, reacting to changes and modifying allocation rules.

Nevertheless, there are two major factors that distinguish the cloud scheduler case from the operating system scheduler case. First is the availability of "intelligence" to sense local conditions and make location-specific optimization decisions. Operating system schedulers cannot have a particular block of memory "decide" about its most efficient utilization, so a central command-and-control scheme is the only viable option. Second is the scale of cloud-based systems. Cloud schedulers must regularly deal with numbers of resources and competing demands that outstrip regular CPUs and multiprocessor systems and the largest cloud systems must deal with numbers of resources much higher than even supercomputers. Because of the size of the optimization problem, it is difficult to reach optimal (or near-optimal) decisions when faced with substantial load.

Further complicating the issue, most cloud systems assume a relatively homogenous pool of underlying computing resources, on top of which a homogenous pool of virtualized resources is instantiated. This is a useful abstraction, but it ignores the underlying differences in hardware. Even when the hardware and virtualized environments are identical, they still vary relative to relative latency, load due to multi-tenancy, disk activity, and differences in performance of the underlying hardware. Further, private clouds especially are created from repurposed servers from other projects or from a pool of unused servers. The hardware components of these servers can vary significantly, causing instance performance variances based on the capabilities of the host compute node for a particular instance.

The differing capabilities and challenges of cloud computing systems make it possible for a local-intelligence-directed system of resource allocation could be more effective than a centralized scheduler. One method of distributed allocation of resources is using market mechanisms, in which different items have a "cost" and an expected utility. Market-based mechanisms can produce globally optimal resource allocations under the correct conditions, even when each actor in the system uses only local decision criteria and local optimization functions.

Accordingly, it is desirable to provide a better-functioning cloud computing system with superior operational capabilities by using local intelligence to create a market-based resource allocation scheme for cloud computing systems.

BRIEF DESCRIPTION OF THE DRAWINGS

FIG. 1 is a schematic view illustrating an external view of a cloud computing system.

FIG. 4*c* is a diagram showing a virtual network according to various embodiments.

FIG. 5*b* is a diagram showing how a directed message is sent using the message service according to various embodiments.

FIG. 5*c* is a diagram showing how a broadcast message is sent using the message service according to various embodiments.

SUMMARY OF THE INVENTION

Figure 2A:
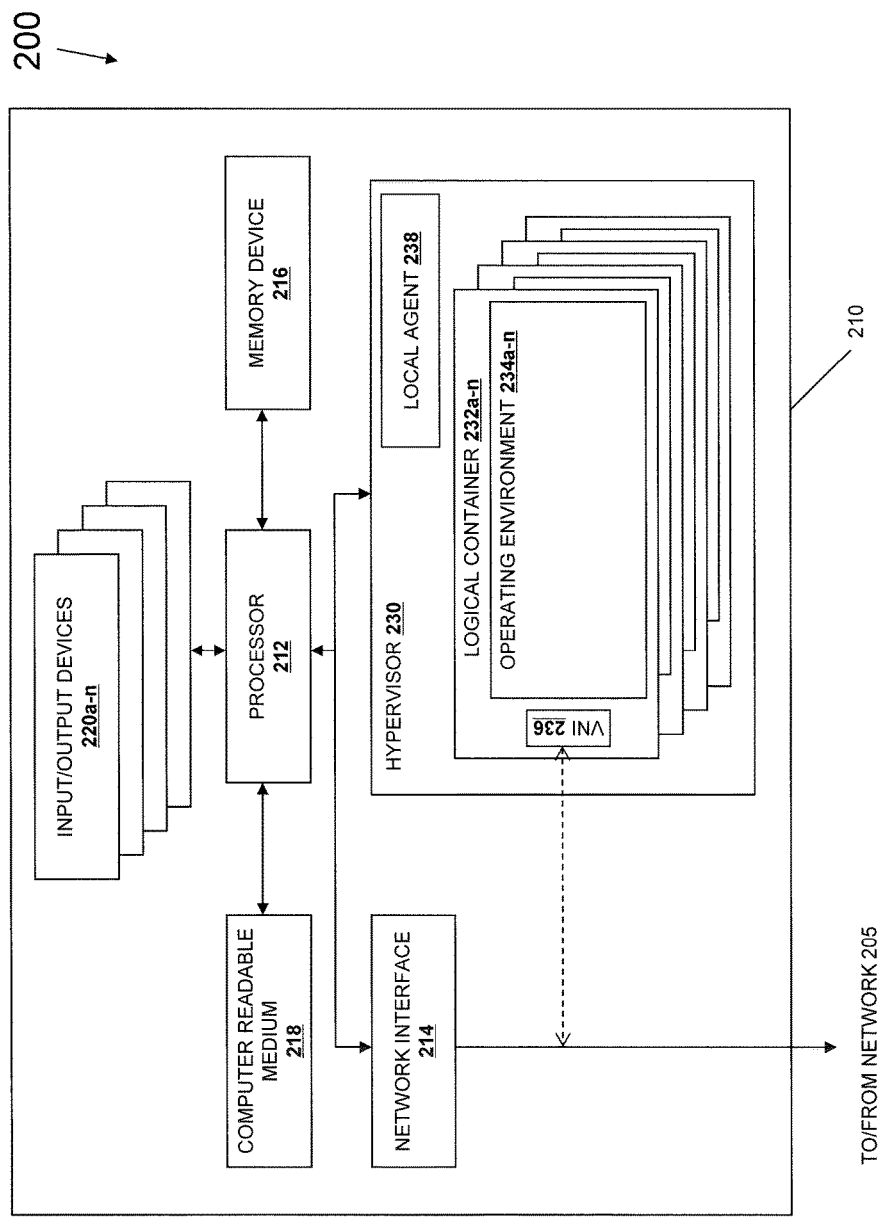
FIG. 2*a* is a schematic view illustrating an information processing system as used in various embodiments.

In one exemplary aspect, the present disclosure is directed to a cloud computing system. The system includes a plurality of computing devices configured to host virtual machine instances, each computing device in the plurality of computing devices including a local optimization agent with an independent optimization function. The computing device may also be equipped with one or more monitors operable to collect metadata about the associated computing device.

DETAILED DESCRIPTION

The following disclosure has reference to market-based allocation of computing services delivered on top of a cloud architecture.

The idea of a market-based allocator has been studied before. For example the following each address a different aspect of market-based allocation. In Malone, Thomas W., et al., "Enterprise: A Market-Like Task Scheduler for Distributed Computing Environments," October, 1983, CISR WP #111, Sloan WP #1537-84, Cambridge, Mass., 46 pages (Malone). Malone describes a system for sharing tasks among processors on a network of personal computers. The system is based on a market metaphor, where client processors send out requests for bids on tasks to be done and other processors responding with bids that reflect machine speed, current loads, and estimated times of completion for the current tasks queued for processing. The client awards tasks to the "winning" bidder and results are returned to the requesting client. If a faster or less-loaded computer becomes available later, the client can cancel the original bid and award it to the new high bidder. Malone's system is best-suited for parallel batch-style workloads. Each task is assumed to be discrete, preemptible, and not long-running—after the award of a task, the task is either completed or canceled.

Another paper was Miller, Mark S., et al., "Markets and Computation: Agoric Open Systems," "Incentive Engineering: for Computational Resource Management," and "Comparative Ecology: A Computational Perspective," in "The Ecology of Computation" (Huberman, ed.), Elsevier Science Publishers/North-Holland, 1988. Miller describes an economic sharing model for systems, wherein machine resources-storage space, processor time, and so forth-have owners, and the owners charge other objects for use of these resources. Objects, in turn, pass these costs on to the objects they serve, or to an object representing the external user; they may add royalty charges, and thus earn a profit. The ultimate user thus pays for all the costs directly or indirectly incurred. If the ultimate user also owns the machine resources (and any objects charging royalties), then currency simply circulates inside the system, incurring computational overhead and (one hopes) providing information that helps coordinate computational activities. The primary mechanisms described are an auction-based processor scheduling system and rent-based storage management—with the economic accounting used to communicate to users the costs of using additional resources.

Kurose, James F., et al., "A Microeconomic Approach to Optimal Resource Allocation in Distributed Computer Systems," IEEE Transactions on Computers, Vol. 38, No. 5, May, 1989, p. 705-717, describes a "resource-based" economic approach to splitting resources across a set of available agents (computers). The algorithm is described in terms of maximizing the marginal utility gained by each agent by splitting a resource across a number of computers. The model is driven by the probability that an outside actor would want to access the resource at a particular node. For example, for a file access scheme, consider then a network of n nodes, $N=\{1, \ldots, n\}$, and define $x_i$ as the fraction of the file resource stored at node i. The purpose of Kurose's distributed resource allocation algorithms is to compute the optimal $(x_1, \ldots, x_n)$, taking into account the communication cost and delay. Kurose considers each resource to be subdividable, at least to a point, to achieve lower costs.

In Waldspurger, Carl A., et al., "Spawn: A Distributed Computational Economy," IEEE Transactions on Software Engineering, Vol. 18, No. 2, February, 1992, p. 103-117, Waldspurger describes a distributed work-sharing system organized as a market economy composed of interacting buyers and sellers. The commodities in this economy are computer processing resources. Buyers purchase time in order to perform some computation. Sellers sell unused, otherwise-wasted processing time on their computer workstations. A seller executes an auction process to manage the sale of his workstation's processing resources, and a buyer executes an application that bids for time on nearby auctions and manages its use of computer processing resources. The prototypical loads described by Waldspurger are either independent tasks or large subdividable tasks such as Monte Carlo simulations.

Wellman, Michael P., "A Market-Oriented Programming Environment and Its Application to Distributed Multicommodity Flow Problems," Journal of Artificial Intelligence Research 1 (1993), 1-23, published 8/93, 23 pages, describes a method of modeling resource allocation problems as a multi-commodity flow problem, where each agent can buy, sell, or consume "goods" and their preferences for consuming various bundles of goods are based upon a utility function. Various agents can be connected into flows to result in work production, with the outputs of some agents being inputs for others. Each agent would seek to maximize its own "profit" by selecting a production mix based upon the availability and fungibility of the various inputs available. In this context, Wellman describes a series of exemplary markets and analyzes the ideal structure of the market as a constrained optimization problem.

In Stonebraker, Michael, et al., "An Economic Paradigm for Query Processing and Data Migration in Mariposa," University of California, Berkley, 1994, 10 pages, Stonebraker describes a database system called "Mariposa" that uses an economic model to simply analysis of various distributed computing problems. Mariposa has two main economic elements. First, data objects are expected to move freely between sites in a computer network in order to optimize the location of an object with respect to current access requirements. Second, each query has a "budget" that it can allocate toward execution. Stonebraker uses a broker to expend the client's budget in a way that balances resource usage with query response time. Various bidding agents present bids to the broker for a fraction of the query work, represented as a subquery, where the bids represent an amount of time necessary to respond to the bid. The broker selects a set of winning bids so that the aggregate cost is less than the budget.

Messer, Alan, et al., "A Market Model for Resource Allocation in Distributed Operating Systems," Systems Architecture Research Center, London, UK, 1995, 12 pages, describes a market based resource allocation model with a client/server style structure. Clients are processes which purchase resources, and servers are processes offering resources. Clients need resources in order to perform their job and they buy these resources from whichever server they wish. Maximization of client resources leads to an economic-based balance of work. Messer's system assumes mutually untrusting agents with strict rules for "money" transfer. Clients are given temporal "wages" and are able to take out "loans" in order to temporarily have higher consumption.

In Cliff, Dave, "Minimal-Intelligence Agents for Bargaining Behaviors in Market-Based Environments," University of Sussex, Brighton, UK, June 1997, 134 pages, Cliff describes market-based allocation generally, and highlights systems for market-based rationing of network bandwidth, memory allocation, air conditioning, pollution regulation, and other areas. Cliff provides an experimental critique of market techniques and analyzes the circumstances under which various models converge or provide allocative efficiency.

Chun, Brent N., et al., "Market-based Proportional Resources Sharing for Clusters," University of California, Berkeley, 1999, 19 pages, describes a cluster resource management scheme based on the notion of a computational economy which optimizes for user value. Clusters are organized as economies of independent sellers and buyers. Cluster nodes act as independent sellers of computing resources and user applications act as buyers who purchase resources based on the value delivered to end users. Users express value using a currency which can be traded for resources and are charged for resource use based on the rate they are willing to pay and the rate other users are willing to pay on competing applications. The allocation of resources is designed to maximize the computing value delivered to users—a balance between minimizing cost and supporting efficient and quick execution. Users are allowed to allocate currency toward more rapid execution or can alternatively choose to minimize cost. Under either framework the more-urgent jobs (as priced by users) get priority while the less-urgent jobs are still managed.

This is similar to Wolski, Rich, et al., "Analyzing Market-based Resource Allocation Strategies for the Computational Grid," University of Tennessee and College of the Holy Cross, 2001, 26 pages, which describes "G-commerce"—dynamic resource allocation across a grid of computers as a market economy in which applications buy the resources they use from resource suppliers using an agreed-upon currency. The model allows disk space and CPU time to be rented from willing sellers. Individual tasks are considered to be subdividable or independent and the various commodities offered (CPU and disk) are considered fungible. Network traffic is modeled as a cost of "shipping" built into the transaction.

Chun, Brent Nee, "Market-based Cluster Resource Management," dissertation for Ph.D. requirements, University of California, Berkeley, Fall 2001, 191 pages, also focuses on using economic measures to focus on end-user value. Chun presents a model for user valuations of computational resources and a way to evaluate market-based systems. When evaluating user-oriented performance metrics, Chun's system optimizes for aggregate utility, modeled as a sum of user utility functions. Chun shows that explicit use of valuation information provides large improvements to user utility for both batch execution and time-shared execution models.

He, Linli, et al., "Forming Resource-Sharing Coalitions: a Distributed Resource Allocation Mechanism for Self-Interested Agents in Computational Grids," 2005 ACM Symposium on Applied Computing, Mar. 13-17, 2005, Santa Fe, N. Mex., 1-58113-964-0/05/0003, p. 84-91, addresses a different issue, that of providing incentives for self-interested agents to contribute their resources to a grid computing solution. He provides an automated negotiation protocol that allows resource-providing coalitions to be formed in a way that provides maximal benefit to the coalition members and still provides the economic incentives necessary for market-based allocation in general.

Buyya, Rajkumar, et al., "Market-Oriented Cloud Computing: Vision, Hype, and Reality for Delivering IT Services as Computing Utilities," GRIDS Laboratory, University of Melbourne, Australia, 2008, 9 pages, describes the use of market-oriented strategies for managing cloud computing cost from an end-user perspective. Buyya primarily discusses GRIDS Lab Aneka, a software platform that translates SLAs, including budgetary, timing, and availability requirements, into a resource allocation schedule. Brokers interact with resource providers to provide raw capacity that is then allocated based upon current demand and contractual requirements.

In Lai, Kevin, et al., "Tycoon: a Distributed Market-based Resource Allocation System," HP Labs, Feb. 1, 2008, arXiv: cs/0404013v1 [cs.DC] 5 Apr. 2004, 8 pages, the authors describe Tycoon, a system that implements a process-based market allocation system using five components: Parent Agent, Child Agent, Auctioneer, Service Location Service, and Bank. The Parent Agent and Child Agent implement the strategy, while the Auctioneer implements the mechanism. The Service Location Service and the Bank are infrastructure.

The parent agent does all high level distributed resource management on behalf of a user. Its two main tasks are budgeting and managing child agents. Child agents bid for resources on hosts and monitor application progress. Although the bids are performed on behalf of the child agent, the child agent actually transfers a lump sum to the auctioneer which then does the fine-grained bidding itself. The Service Location Service is used to locate particular kinds of resources and auctioneers use it to advertise resources. The bank maintains account balances for all users and providers and transfers "balances." The system itself is implemented as a modification to the Linux kernel scheduler that allows processes to be auctioned off and transferred to a processor in a cluster.

An, Bo, et al., "Automated Negotiation with Decommitment for Dynamic Resource Allocation in Cloud Computing," University of Massachusetts, Amherst, p. 981-988, describes a negotiation model for user-allocated tasks, where the value of bids is based upon expected future execution time. Because of the uncertainty associated with when tasks may actually end, An describes a mechanism for cancelling bids and reallocating tasks to a newly-available agent with a better bid.

Stößer, Jochen, et al., "Market-Based Pricing in Grids: On Strategic Manipulation and Computational Cost," Karlsruhe Institute of Technology, Universitat Karlsruhe, and Albert-Ludwigs-Universitat Freiberg, Germany, 2010, 31 pages. Stößer describes a mechanism intended to perform job scheduling in a distributed computing environment with heterogeneous and selfish users. Users and providers are assumed to have a priori knowledge about the starting times and runtimes of jobs and the availability of nodes. For example, a provider might only be able or willing to temporarily contribute a node to the grid for a fixed and known period of time. The mechanism must therefore allow users and providers to express time constraints and consider these when making its allocation decisions. In this context, Stößer provides a heuristic measure that is more computationally efficient than exact allocation schemes but gives near-optimal results.

Niyato, Dusit, et al., "Cooperative Virtual Machine Management for Multi-Organization Cloud Computing Environment," Nanyang Technological University, Singapore, 2011, p. 528-537. Niyato describes multi-organization sharing of a data center, where multiple agents cooperate to effectively schedule the available computers over a period of time. By coordinating demands, the aggregate load can be improved at lower resource costs because low-demand organizations will be able to provide capacity to high-demand organizations.

While the systems described above have the concept of market-based allocation in common, there are substantial differences and improvements that will be made apparent through the disclosure below. In particular, a number of distinguishing features in virtual machine allocation in a cloud computing context are not addressed in whole or in part. These include the use of long-running tasks as opposed to short-run tasks; the ability for a task to change its resource usage over time; the indivisibility of many or most tasks; the multifaceted resource cost of virtual machine loads; the need to migrate tasks and add capacity over time; the individual intelligence of host agents, as opposed to a "borrowed" intelligence model that computes prices and strategies more globally; variability in resources at the agent level due to computational capacity differences; a model combining a trusted agent with an untrusted workload; a highest-utilization optimization model, as opposed to a user-directed cost model; and the internalization of external coupling or other externalities.

A system for addressing these issues and providing various advantages will be discussed in two parts below. First, a number of embodiments will be shown describing appropriate environments for the application of a market-based allocation system. Second, a procedure for implementing and using a market-based allocation system in the context of some of the embodiments discussed in the first part.

Referring now to FIG. 1, an external view of one embodiment of a cloud computing system 110 is illustrated. The cloud computing system 110 includes a user device 102 connected to a network 104 such as, for example, a Transport Control Protocol/Internet Protocol (TCP/IP) network (e.g., the Internet.) The user device 102 is coupled to the cloud computing system 110 via one or more service endpoints 112. Depending on the type of cloud service provided, these endpoints give varying amounts of control relative to the provisioning of resources within the cloud computing system 110. For example, SaaS endpoint 112a will typically only give information and access relative to the application running on the cloud storage system, and the scaling and processing aspects of the cloud computing system will be obscured from the user. PaaS endpoint 112b will typically give an abstract Application Programming Interface (API) that allows developers to declaratively request or command the backend storage, computation, and scaling resources provided by the cloud, without giving exact control to the user. IaaS endpoint 112c will typically provide the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 110 to be used for new, user-defined services without requiring specific support.

It is important to recognize that the control allowed via an IaaS endpoint is not complete. Within the cloud computing system 110 are one or more cloud controllers 120 (running what is sometimes called a "cloud operating system") that work on an even lower level, interacting with physical machines, managing the contradictory demands of the multitenant cloud computing system 110. The workings of the cloud controllers 120 are typically not exposed outside of the cloud computing system 110, even in an IaaS context. In one embodiment, the commands received through one of the service endpoints 112 are then routed via one or more internal networks 114. The internal network 114 couples the different services to each other. The internal network 114 may encompass various protocols or services, including but not limited to electrical, optical, or wireless connections at the physical layer; Ethernet, Fibre channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 114 is typically not exposed outside the cloud computing system, except to the extent that one or more virtual networks 116 may be exposed that control the internal routing according to various rules. The virtual networks 116 typically do not expose as much complexity as may exist in the actual internal network 114; but varying levels of granularity can be exposed to the control of the user, particularly in IaaS services.

In one or more embodiments, it may be useful to include various processing or routing nodes in the network layers 114 and 116, such as proxy/gateway 118. Other types of processing or routing nodes may include switches, routers, switch fabrics, caches, format modifiers, or correlators. These processing and routing nodes may or may not be visible to the outside. It is typical that one level of processing or routing nodes may be internal only, coupled to the internal network 114, whereas other types of network services may be defined by or accessible to users, and show up in one or more virtual networks 116. Either of the internal network 114 or the virtual networks 116 may be encrypted or authenticated according to the protocols and services described below.

In various embodiments, one or more parts of the cloud computing system 110 may be disposed on a single host. Accordingly, some of the "network" layers 114 and 116 may be composed of an internal call graph, inter-process communication (IPC), or a shared memory communication system.

Once a communication passes from the endpoints via a network layer 114 or 116, as well as possibly via one or more switches or processing devices 118, it is received by one or more applicable cloud controllers 120. The cloud controllers 120 are responsible for interpreting the message and coordinating the performance of the necessary corresponding services, returning a response if necessary. Although the cloud controllers 120 may provide services directly, more typically the cloud controllers 120 are in operative contact with the cloud services 130 necessary to provide the corresponding services. For example, it is possible for different services to be provided at different levels of abstraction. For example, a "compute" service 130a may work at an IaaS level, allowing the creation and control of user-defined virtual computing resources. In the same cloud computing system 110, a PaaS-level object storage service 130b may provide a declarative storage API, and a SaaS-level Queue service 130c, DNS service 130d, or Database service 130e may provide application services without exposing any of the underlying scaling or computational resources. Other services are contemplated as discussed in detail below.

In various embodiments, various cloud computing services or the cloud computing system itself may require a message passing system. The message routing service 140 is available to address this need, but it is not a required part of the system architecture in at least one embodiment. In one embodiment, the message routing service is used to transfer messages from one component to another without explicitly linking the state of the two components. Note that this message routing service 140 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 150 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it may be useful for the cloud computing system 110 to have a system controller 160. In one embodiment, the system controller 160 is similar to the cloud computing controllers 120, except that it is used to control or direct operations at the level of the cloud computing system 110 rather than at the level of an individual service.

For clarity of discussion above, only one user device 102 has been illustrated as connected to the cloud computing system 110, and the discussion generally referred to receiving a communication from outside the cloud computing system, routing it to a cloud controller 120, and coordinating processing of the message via a service 130, the infrastructure described is also equally available for sending out messages. These messages may be sent out as replies to previous communications, or they may be internally sourced. Routing messages from a particular service 130 to a user device 102 is accomplished in the same manner as receiving a message from user device 102 to a service 130, just in reverse. The precise manner of receiving, processing, responding, and sending messages is described below with reference to the various discussed service embodiments. One of skill in the art will recognize, however, that a plurality of user devices 102 may, and typically will, be connected to the cloud computing system 110 and that each element or set of elements within the cloud computing system is replicable as necessary. Further, the cloud computing system 110, whether or not it has one endpoint or multiple endpoints, is expected to encompass embodiments including public clouds, private clouds, hybrid clouds, and multi-vendor clouds.

Each of the user device 102, the cloud computing system 110, the endpoints 112, the network switches and processing nodes 118, the cloud controllers 120 and the cloud services 130 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, diagram 200 shows an information processing system 210 configured to host one or more virtual machines, coupled to a network 205. The network 205 could be one or both of the networks 114 and 116 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220*a-n* which is operably coupled to the processor 212, for inputting or outputting information, such as a display device 220*a*, a print device 220*b*, or other electronic circuitry 220*c-n* for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xen-server, KVM, VMware, Microsoft's Hyper-V, and emulation programs such as QEMU.

The hypervisor 230 includes the functionality to add, remove, and modify a number of logical containers 232a-n associated with the hypervisor. Zero, one, or many of the logical containers 232a-n contain associated operating environments 234a-n. The logical containers 232a-n can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

In one embodiment, the local agent 238 is implemented as part of the hypervisor or as a process running on a hypervisor-enabled operating system. In another embodiment, the local agent 238 is implemented as an operating environment 234 running in one of the logical containers 232. A third embodiment implements the local agent as an independent co-processor coupled to and in communication with the machine 210, as described elsewhere in this specification. It is also contemplated that different implementations may use one or more of these as a set of interoperating but discrete components, some or all of which may be implemented as software programs, with different portions implemented in hardware, in software, and in various operating environments to match different latency and computing needs. It is expected that in some embodiments, the local agent 238 will have an integrated battery and will be able to spend an extended period of time without drawing current. Various embodiments also contemplate the use of an embedded Linux or Linux-Android environment.

The local agent 238 has access to the workload statistics and measurements as seen from various perspectives, both inside various operating environments 234, from the perspective of the hypervisor 230, and as discussed below, from the perspective of the hardware from the hardware monitoring systems described relative to FIG. 2b. In one minimum embodiment, the local agent 238 is able to measure processor utilization, hard drive utilization, I/O operations, and network utilization for the information processing system 210 as a whole as well as for each individual logical container 232 and operating environment 234. Other whole-system and per-environment taps are contemplated. For example, one embodiment uses DTrace taps to record and monitor events throughout the system—both on a per-container and hypervisor level. The variety and completeness of DTrace, SystemTap, or similar tracing systems is well-known in the art. The full range of these taps is contemplated to be available for various implementations, both at the individual container/environment level as well as at the hypervisor level. Further description of the monitoring capabilities of the local agent is included below relative to the discussion of FIG. 9.

The local agent includes independent processing capability and may include a rules engine, multivariate optimizer, or fuzzy logic processor used to evaluate the inputs provided by the monitoring capabilities described herein and to choose a course of action according to one or more local optimization algorithms. The exact functioning of these algorithms is described below relative to FIG. 11.

In a further embodiment, the local agent 238 is further operable to store history concerning past utilization of resources using a database. To avoid excessive storage demands, the database may be located on another system or may be limited in the range of inputs maintained, using a sliding window or similar methodology. Another embodiment uses historical information to predict future usage, including periodic usage based upon day/night cycles of demand, scheduled tasks, or days of the week.

As described in co-pending application Ser. No. 13/467,686, entitled "Wake-on-LAN and Instantiate-on-LAN in a Cloud Computing System," the local agent 238 is operable to work with the hypervisor to suspend, profile, snapshot, or transfer, or initialize an operating environment 234 (most frequently a virtual machine, or "VM") while being on-line and active during the transfer procedure. The VM can be transferred from a first information processing system 210 to a second information processing system 210 seamlessly, without ever having had the experience of being powered off. In a further embodiment of the VM transfer system described therein, the minimal disruption of the network connection can be avoided via the cooperation of the virtual networking environment. Accordingly, even active connections can be transparently rerouted with the only outwardly-visible result of VM transfer being a period of increased latency for connections. Time-sensitive responses (such as TCP ACKS) can be handled by an intermediary such as the hypervisor 230 or an intermediate network device connected to network 205. Other types of traffic can be buffered until delivery to the VM on the new device 210. In a further embodiment, the local agent may simulate network congestion to a particular VNI 236 to reduce the TCP window size, induce retransmission of some packets, and generally slow the flow of new information received during the transfer process. Route changes can be managed in real time using existing configuration tools for network nodes or by using a software-defined network technology such as OpenFlow. Other VM migration capabilities, such as those marketed under the brand of VMware VMotion can also be used, with the caveat that the time necessary to migrate a VM may vary and the underlying hypervisor management system may or may not allow the migration of live virtual machines while still maintaining connectivity or apparent uptime.

Figure 2B:
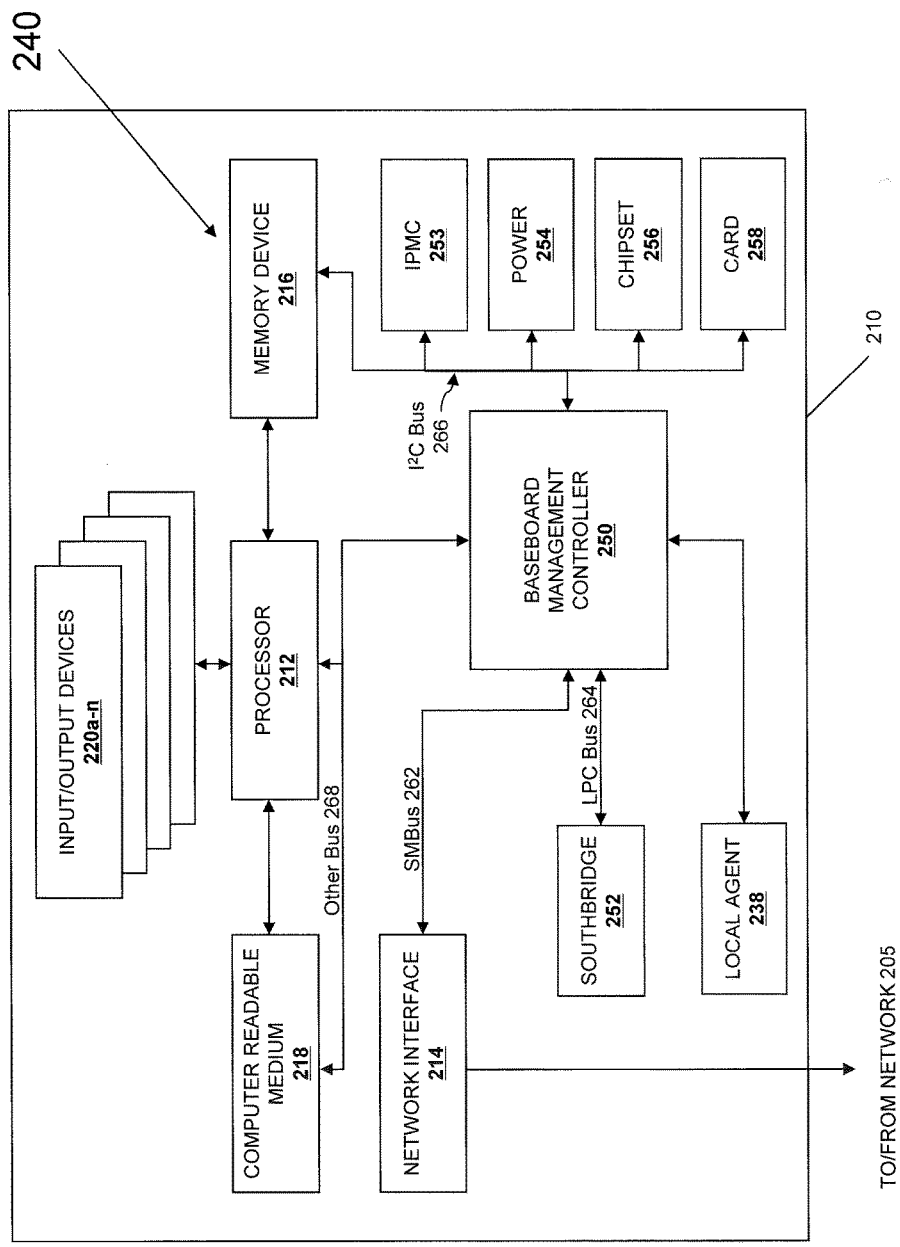
FIG. 2*b* is a schematic view illustrating an IPMI subsystem as used in various embodiments.

Turning to FIG. 2b, one embodiment of the information processing system 210 includes a number of hardware sensors implementing the Intelligent Platform Management Interface (IPMI) standard. IPMI is a message-based, hardware-level interface specification that operates independently of the hypervisor 230 and any logical containers 232 or operating environments 234.

The IPMI subsystem 240 includes one or more baseboard management controller (BMC) 250. In an embodiment that includes multiple management controllers, one BMC 250 is designated as the primary controller and the other controllers are designated as satellite controllers. The satellite controllers connect to the BMC via a system interface called Intelligent Platform Management Bus/Bridge (IPMB), which is a superset of an I²C (Inter-Integrated Circuit) bus such as I²C bus 266. The BMC 250 can also connect to satellite controllers via an Intelligent Platform Management Controller (IPMC) bus or bridge 253. The BMC 250 is managed with the Remote Management Control Protocol (RMCP) or RMCP+, or a similar protocol.

The IPMI subsystem 240 further includes other types of busses, including System Management (SMBus) 262, LPC bus 264, and other types of busses 268 as known in the art and provided by various system integrators for use with BMC 250. By use of these busses, the BMC can interact with or monitor different hardware subsystems within the information processing system 210, including the Southbridge 252, the network interface 214, the computer readable medium 218, the processor 212, the memory device 216, the power supply 254, the chipset 256 and the GPU or other card 258. In one embodiment, each of these subsystems has integrated testing and monitoring functionality, and exposes that directly to the BMC 250. In a second embodiment, there are one or more sensors arrayed on the motherboard or within the chassis of the information processing system 210 or a larger rack or computing enclosure. For example, SMART sensors are used in one embodiment to provide hard drive related information and heat sensors are used to provide temperature information for particular chips or parts of a chipset, fan and airspeed sensors are used to provide air movement and temperature information. Each part of the system can be connected to or instrumented by means of the IPMI subsystem 240, and the absence of an exemplary connection in FIG. 2b should not be considered limiting.

In one embodiment, the IPMI subsystem 240 is used to monitor the status and performance of the information processing system 210 by recording system temperatures, voltages, fans, power supplies and chassis information. In another embodiment, IPMI subsystem 240 is used to query inventory information and provide a hardware-based accounting of available functionality. In a third embodiment, IPMI subsystem 240 reviews hardware logs of out-of-range conditions and perform recovery procedures such as issuing requests from a remote console through the same connections. In a fourth embodiment, the IPMI subsystem provides an alerting mechanism for the system to send a simple network management protocol (SNMP) platform event trap (PET).

In one embodiment, the IPMI subsystem 240 also functions while hypervisor 230 is active. In this embodiment, the IPMI subsystem 240 exposes management data and structures to the system management software. In one implementation, the BMC 250 communicates via a direct out-of-band local area network or serial connection or via a side-band local area network connection to a remote client. In this embodiment, the side-band LAN connection utilizes the network interface 214. In a second embodiment, a dedicated network interface 214 is also provided. In a third embodiment, the BMC 250 communicates via serial over LAN, whereby serial console output can be received and interacted with via network 205. In other embodiments, the IPMI subsystem 240 also provides KVM (Keyboard-Video-Monitor switching) over IP, remote virtual media and an out-of-band embedded web server interface.

In a further embodiment, the IPMI subsystem 240 is extended with "virtual" sensors reporting on the performance of the various virtualized logical containers 232 supported by hypervisor 230. Although these are not strictly IPMI sensors because they are virtual and are not independent of the hypervisor 230 or the various logical containers 232 or operating environments 234, the use of a consistent management protocol for monitoring the usage of different parts of the system makes the extension of the IPMI subsystem worthwhile. In this embodiment, each logical container includes a virtual monitor that exposes IPMI information out via an IPMC connection to the BMC 250. In one embodiment, the virtual sensors are chosen to mimic their physical counterparts relative to the virtual "hardware" exposed within the logical container 232. In a second embodiment, the IPMI interface is extended with additional information that is gathered virtually and is only applicable to a virtual environment. In embodiments that include IPMI or similar hardware sensors, it is contemplated that the local agent 238 will have access to the measurements collected.

Figure 3:
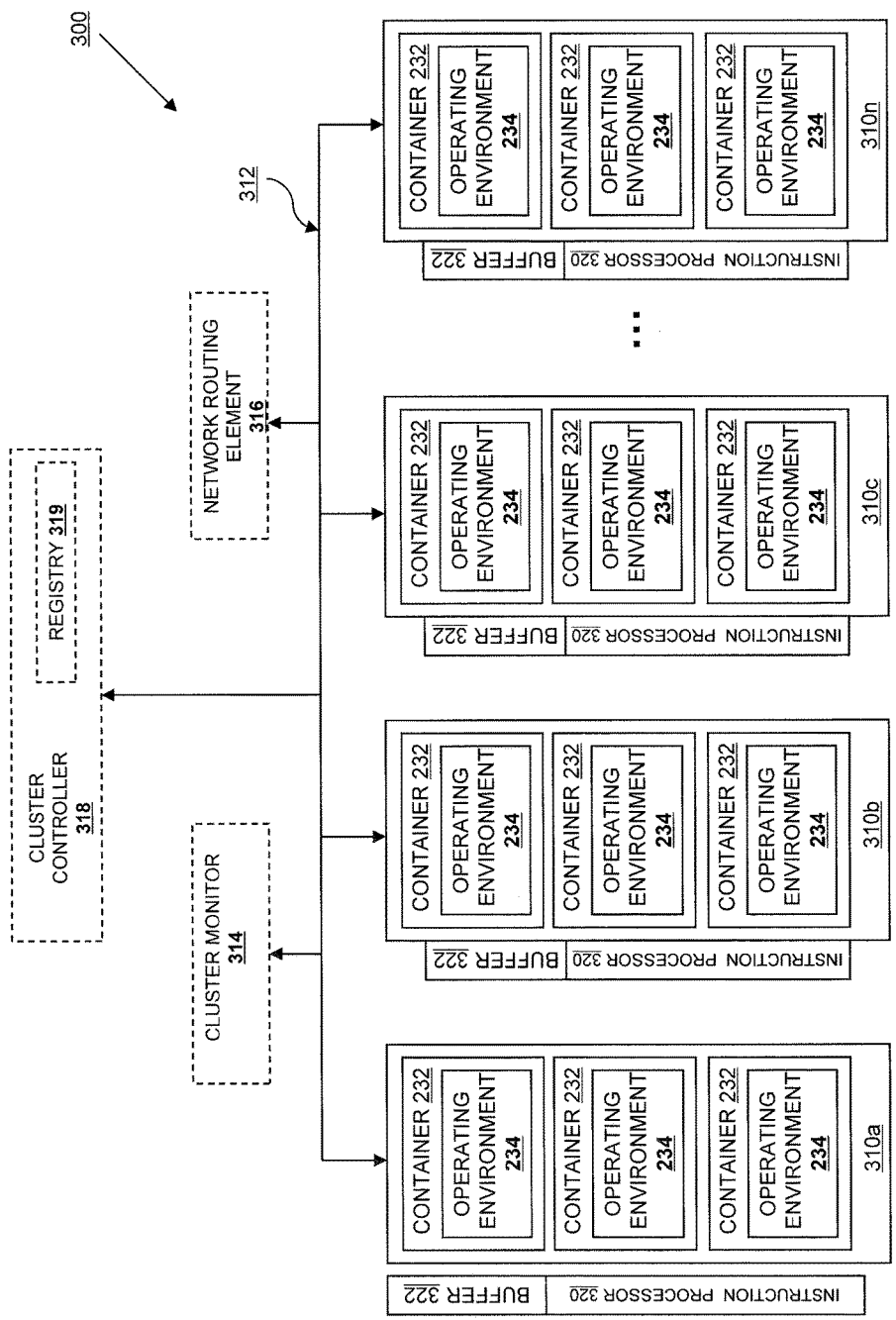
FIG. 3 is a virtual machine management system as used in various embodiments.

Turning now to FIG. 3, a simple network operating environment 300 for a cloud controller or cloud service is shown. The network operating environment 300 includes multiple information processing systems 310a-n, each of which correspond to a single information processing system 210 as described relative to FIG. 2, including a hypervisor 230, zero or more logical containers 232 and zero or more operating environments 234. The information processing systems 310a-n are connected via a communication medium 312, typically implemented using a known network protocol such as Ethernet, Fibre Channel, Infiniband, or IEEE 1394. For ease of explanation, the network operating environment 300 will be referred to as a "cluster," "group," or "zone" of operating environments. The cluster may also include a cluster monitor 314 and a network routing element 316. The cluster monitor 314 and network routing element 316 may be implemented as hardware, as software running on hardware, or may be implemented completely as software. In one implementation, one or both of the cluster monitor 314 or network routing element 316 is implemented in a logical container 232 using an operating environment 234 as described above. In another embodiment, one or both of the cluster monitor 314 or network routing element 316 is implemented so that the cluster corresponds to a group of physically co-located information processing systems, such as in a rack, row, or group of physical machines.

The cluster monitor 314 provides an interface to the cluster in general, and provides a single point of contact allowing someone outside the system to query and control any one of the information processing systems 310, the logical containers 232 and the operating environments 234. In one embodiment, the cluster monitor also provides monitoring and reporting capabilities.

The network routing element 316 allows the information processing systems 310, the logical containers 232 and the operating environments 234 to be connected together in a network topology. The illustrated tree topology is only one possible topology; the information processing systems and operating environments can be logically arrayed in a ring, in a star, in a graph, or in multiple logical arrangements through the use of VLANs and software-defined network topologies generally.

In one embodiment, the cluster also includes a cluster controller 318. The cluster controller is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234.

The cluster controller 318 is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234. In one embodiment, the cluster controller 318 includes a registry of VM information 319. In a second embodiment, the registry 319 is associated with but not included in the cluster controller 318.

In one embodiment, the cluster also includes one or more instruction processors 320. In the embodiment shown, the instruction processor is located in the hypervisor, but it is also contemplated to locate an instruction processor within an active VM or at a cluster level, for example in a piece of machinery associated with a rack or cluster. In one embodiment, the instruction processor 320 is implemented in a tailored electrical circuit or as software instructions to be used in conjunction with a physical or virtual processor to create a hardware-software combination that implements the specific functionality described herein. To the extent that one embodiment includes computer-executable instructions, those instructions may include software that is stored on a computer-readable medium. Further, one or more embodiments have associated with them a buffer 322. The buffer 322 can take the form of data structures, a memory, a computer-readable medium, or an off-script-processor facility. For example, one embodiment uses a language runtime as an instruction processor 320. The language runtime can be run directly on top of the hypervisor, as a process in an active operating environment, or can be run from a low-power embedded processor. In a second embodiment, the instruction processor 320 takes the form of a series of interoperating but discrete components, some or all of which may be implemented as software programs. For example, in this embodiment, an interoperating bash shell, gzip program, an rsync program, and a cryptographic accelerator chip are all components that may be used in an instruction processor 320. In another embodiment, the instruction processor 320 is a discrete component, using a small amount of flash and a low power processor, such as a low-power ARM processor. This hardware-based instruction processor can be embedded on a network interface card, built into the hardware of a rack, or provided as an add-on to the physical chips associated with an information processing system 310. It is expected that in many embodiments, the instruction processor 320 will have an integrated battery and will be able to spend an extended period of time without drawing current. Various embodiments also contemplate the use of an embedded Linux or Linux-Android environment.

Networking

Figure 4A:
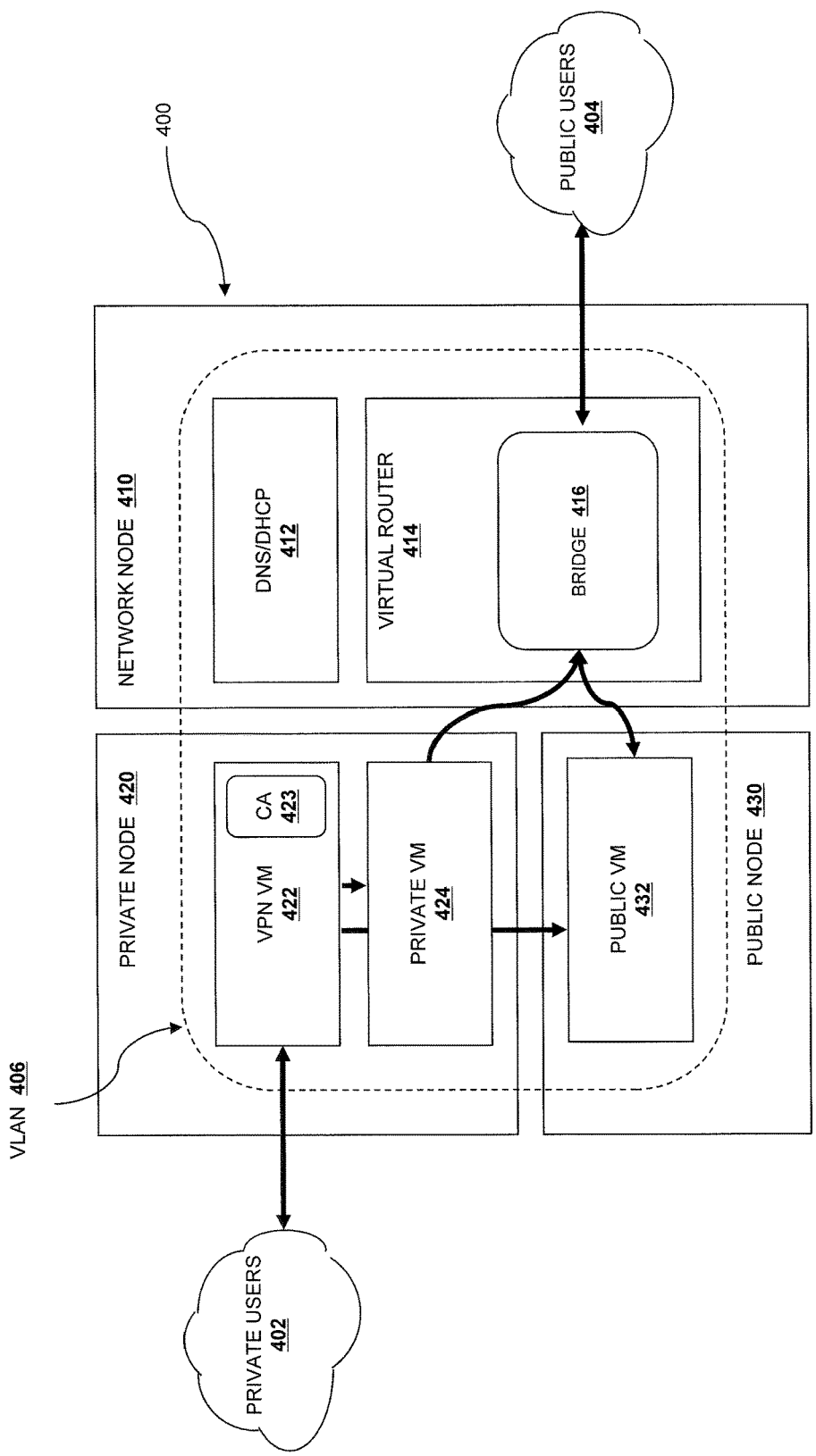
FIG. 4*a* is a diagram showing types of network access available to virtual machines in a cloud computing system according to various embodiments.

Referring now to FIG. 4a, a diagram of the network connections available to one embodiment of the system is shown. The network 400 is one embodiment of a virtual network 116 as discussed relative to FIG. 1, and is implemented on top of the internal network layer 114. A particular node is connected to the virtual network 400 through a virtual network interface 236 operating through physical network interface 214. The VLANs, VSwitches, VPNs, and other pieces of network hardware (real or virtual) are may be network routing elements 316 or may serve another function in the communications medium 312.

In one embodiment, the cloud computing system 110 uses both "fixed" IPs and "floating" IPs to address virtual machines. Fixed IPs are assigned to an instance on creation and stay the same until the instance is explicitly terminated. Floating IPs are IP addresses that can be dynamically associated with an instance. A floating IP address can be disassociated and associated with another instance at any time.

Different embodiments include various strategies for implementing and allocating fixed IPs, including "flat" mode, a "flat DHCP" mode, and a "VLAN DHCP" mode.

In one embodiment, fixed IP addresses are managed using a flat Mode. In this embodiment, an instance receives a fixed IP from a pool of available IP addresses. All instances are attached to the same bridge by default. Other networking configuration instructions are placed into the instance before it is booted or on boot.

In another embodiment, fixed IP addresses are managed using a flat DHCP mode. Flat DHCP mode is similar to the flat mode, in that all instances are attached to the same bridge. Instances will attempt to bridge using the default Ethernet device or socket. Instead of allocation from a fixed pool, a DHCP server listens on the bridge and instances receive their fixed IPs by doing a dhcpdiscover.

Turning now to a preferred embodiment using VLAN DHCP mode, there are two groups of off-local-network users, the private users 402 and the public internet users 404. To respond to communications from the private users 402 and the public users 404, the network 400 includes three nodes, network node 410, private node 420, and public node 430. The nodes include one or more virtual machines or virtual devices, such as DNS/DHCP server 412 and virtual router 414 on network node 410, VPN 422 and private VM 424 on private node 420, and public VM 432 on public node 430.

In one embodiment, VLAN DHCP mode requires a switch that supports host-managed VLAN tagging. In one embodiment, there is a VLAN 406 and bridge 416 for each project or group. In the illustrated embodiment, there is a VLAN associated with a particular project. The project receives a range of private IP addresses that are only accessible from inside the VLAN. and assigns an IP address from this range to private node 420, as well as to a VNI in the virtual devices in the VLAN. In one embodiment, DHCP server 412 is running on a VM that receives a static VLAN IP address at a known address, and virtual router VM 414, VPN VM 422, private VM 424, and public VM 432 all receive private IP addresses upon request to the DHCP server running on the DHCP server VM. In addition, the DHCP server provides a public IP address to the virtual router VM 414 and optionally to the public VM 432. In a second embodiment, the DHCP server 412 is running on or available from the virtual router VM 414, and the public IP address of the virtual router VM 414 is used as the DHCP address.

In an embodiment using VLAN DHCP mode, there is a private network segment for each project's or group's instances that can be accessed via a dedicated VPN connection from the Internet. As described below, each VLAN project or group gets its own VLAN, network bridge, and subnet. In one embodiment, subnets are specified by the network administrator, and assigned dynamically to a project or group when required. A DHCP Server is started for each VLAN to pass out IP addresses to VM instances from the assigned subnet. All instances belonging to the VLAN project or group are bridged into the same VLAN. In this fashion, network traffic between VM instances belonging to the same VLAN is always open but the system can enforce isolation of network traffic between different projects by enforcing one VLAN per project.

As shown in FIG. 4*a*, VLAN DHCP mode includes provisions for both private and public access. For private access (shown by the arrows to and from the private users cloud 402), users create an access keypair (as described further below) for access to the virtual private network through the gateway VPN VM 422. From the VPN VM 422, both the private VM 424 and the public VM 432 are accessible via the private IP addresses valid on the VLAN.

Public access is shown by the arrows to and from the public users cloud 404. Communications that come in from the public users cloud arrive at the virtual router VM 414 and are subject to network address translation (NAT) to access the public virtual machine via the bridge 416. Communications out from the private VM 424 are source NATted by the bridge 416 so that the external source appears to be the virtual router VM 414. If the public VM 432 does not have an externally routable address, communications out from the public VM 432 may be source NATted as well.

In one embodiment of VLAN DHCP mode, the second IP in each private network is reserved for the VPN VM instance 422. This gives a consistent IP to the instance so that forwarding rules can be more easily created. The network for each project is given a specific high-numbered port on the public IP of the network node 410. This port is automatically forwarded to the appropriate VPN port on the VPN VM 422.

In one embodiment, each group or project has its own certificate authority (CA) 423. The CA 423 is used to sign the certificate for the VPN VM 422, and is also passed to users on the private users cloud 402. When a certificate is revoked, a new Certificate Revocation List (CRL) is generated. The VPN VM 422 will block revoked users from connecting to the VPN if they attempt to connect using a revoked certificate.

In a project VLAN organized similarly to the embodiment described above, the project has an independent RFC 1918 IP space; public IP via NAT; has no default inbound network access without public NAT; has limited, controllable outbound network access; limited, controllable access to other project segments; and VPN access to instance and cloud APIs. Further, there is a DMZ segment for support services, allowing project metadata and reporting to be provided in a secure manner.

In one embodiment, VLANs are segregated using 802.1q VLAN tagging in the switching layer, but other tagging schemes such as 802.1ad, MPLS, or frame tagging are also contemplated. Network hosts create VLAN-specific interfaces and bridges as required.

In one embodiment, private VM 424 has per-VLAN interfaces and bridges created as required. These do not have IP addresses in the host to protect host access. Access is provided via routing table entries created per project and instance to protect against IP/MAC address spoofing and ARP poisoning.

Figure 4B:
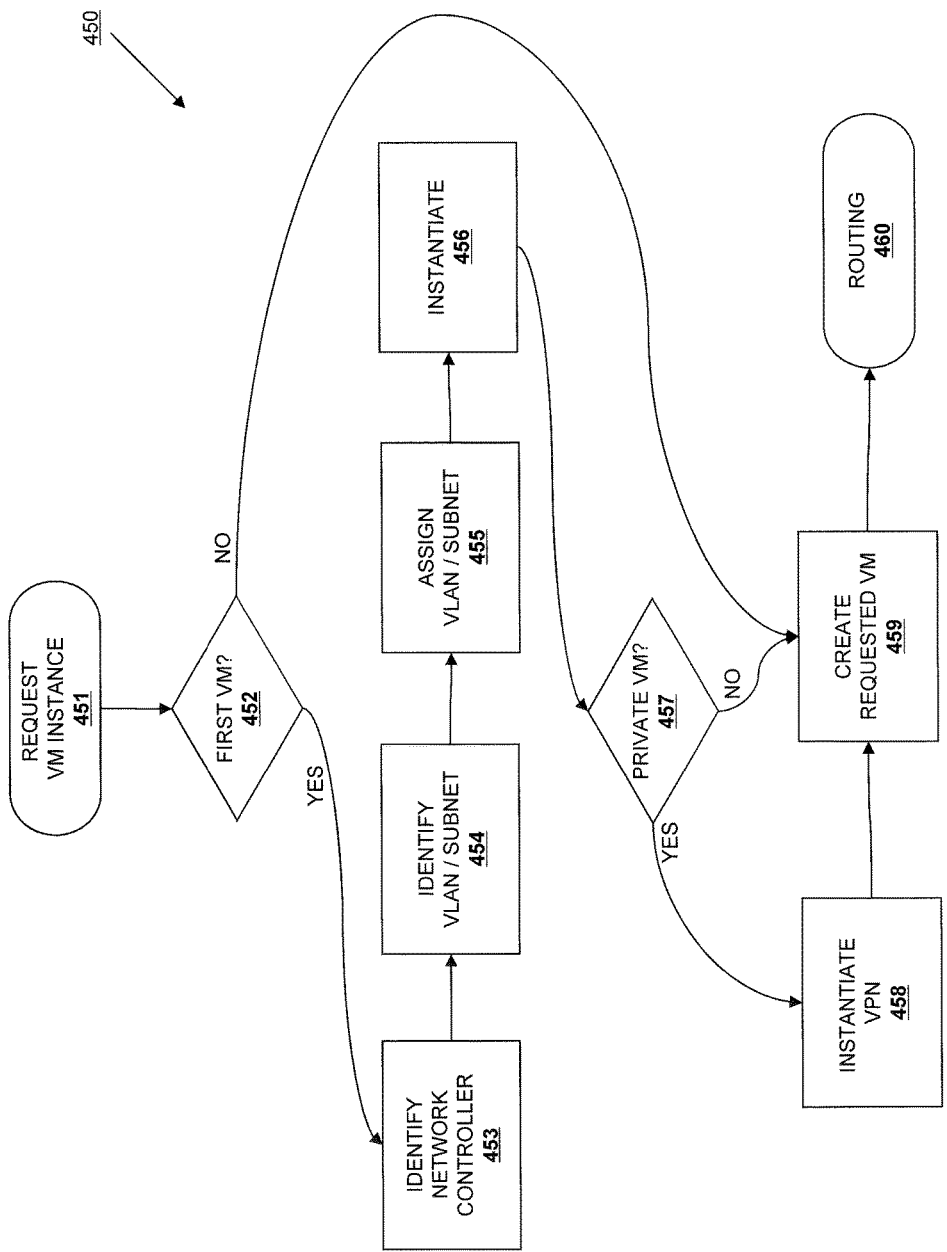
FIG. 4*b* is a flowchart showing the establishment of a VLAN for a project according to various embodiments.

FIG. 4*b* is a flowchart showing the establishment of a VLAN for a project according to one embodiment. The process 450 starts at step 451, when a VM instance for the project is requested. When running a VM instance, a user needs to specify a project for the instances, and the applicable security rules and security groups (as described herein) that the instance should join. At step 452, a cloud controller determines if this is the first instance to be created for the project. If this is the first, then the process proceeds to step 453. If the project already exists, then the process moves to step 459. At step 453, a network controller is identified to act as the network host for the project. This may involve creating a virtual network device and assigning it the role of network controller. In one embodiment, this is a virtual router VM 414. At step 454, an unused VLAN id and unused subnet are identified. At step 455, the VLAN id and subnet are assigned to the project. At step 456, DHCP server 412 and bridge 416 are instantiated and registered. At step 457, the VM instance request is examined to see if the request is for a private VM 424 or public VM 432. If the request is for a private VM, the process moves to step 458. Otherwise, the process moves to step 460. At step 458, the VPN VM 422 is instantiated and allocated the second IP in the assigned subnet. At step 459, the subnet and a VLAN have already been assigned to the project. Accordingly, the requested VM is created and assigned and assigned a private IP within the project's subnet. At step 460, the routing rules in bridge 416 are updated to properly NAT traffic to or from the requested VM.

Referring now to FIG. 4c, an alternative implementation based upon a software-defined network architecture is shown at 470. Visible at 472 (with both dotted and solid lines) is the physical network 114 as described in FIG. 1. Individual information processing systems 473a and 473b are connected to the physical network via physical network interface as shown at 214 in FIG. 2a. Within each information processing system are one or more logical containers and operating environments, each together constituting a "VM" as shown at 474a and 474b. The physical network 472 is shared between different virtual networks.

Overlaid on top of the physical network is virtual network 476, corresponding to virtual network 116 as discussed relative to FIG. 1. Network flows are routed both at the physical network level (472) as well as at the virtual network level (476), and there are independent addresses for each domain. A network is an isolated virtual layer-2 broadcast domain that is typically reserved for the tenant who created it unless the network is configured to be shared. Tenants can create multiple networks until they reach the thresholds specified by per-tenant quotas. Within each network there are subnets (not specifically shown). A subnet represents an IP address block that can be used to assign IP addresses to virtual instances. Each subnet must have a CIDR and must be associated with a network. IPs can be either selected from the whole subnet CIDR or from allocation pools that can be specified by the user. A subnet can also optionally have a gateway, a list of DNS servers, and host routes. This information is pushed to instances whose interfaces are associated with the subnet.

Shown at 478 are virtual network ports. These are associated with the virtual network interfaces 236 discussed relative to FIG. 2. Virtual instances attach their interfaces into ports. The logical port defines the MAC address and the IP addresses to be assigned to the interfaces plugged into them. When IP addresses are associated to a port, this also implies the port is associated with a subnet, as the IP address was taken from the allocation pool for a specific subnet. Network flows are defined in terms of their connections between ports. A port is most often defined on a VNI, but physical ports can also participate in virtual network 476.

Within the virtual network 476, there is a controller 480 and one or more virtual network elements (VNE) 482. The controller performs IP address management on behalf of the virtual network 476, and can direct the assignment of flows between various ports. It maintains the mapping between the underlying physical network 472 and the virtual network 476 that is imposed on top. The VNE 482 is a software, hardware, or hybrid device used to implement network routing, switching, or filtering logic for the virtual network 476. Exemplary types of VNEs include switches, routers, firewalls, gateways, and packet filter/inspection engines. The VNE 482 can report back to the controller 480, and the configuration of VNE 482 can be changed programmatically by the controller 480, as shown by the bidirectional communications shown at 484. Because the connections between various VMs are defined virtually, the VM 1 (474a) can actually move between IPS 473a and 473b and still maintain its MAC and IP address and all associated flows by just updating the mapping in the controller 480 and the configuration in VNE 482.

Message Service

Between the various virtual machines and virtual devices, it may be necessary to have a reliable messaging infrastructure. In various embodiments, a message queuing service is used for both local and remote communication so that there is no requirement that any of the services exist on the same physical machine. Various existing messaging infrastructures are contemplated, including AMQP, ZeroMQ, STOMP and XMPP. Note that this messaging system may or may not be available for user-addressable systems; in one preferred embodiment, there is a separation between internal messaging services and any messaging services associated with user data.

In one embodiment, the message service sits between various components and allows them to communicate in a loosely coupled fashion. This can be accomplished using Remote Procedure Calls (RPC hereinafter) to communicate between components, built atop either direct messages and/or an underlying publish/subscribe infrastructure. In a typical embodiment, it is expected that both direct and topic-based exchanges are used. This allows for decoupling of the components, full asynchronous communications, and transparent balancing between equivalent components. In some embodiments, calls between different APIs can be supported over the distributed system by providing an adapter class which takes care of marshalling and unmarshalling of messages into function calls.

In one embodiment, a cloud controller 120 (or the applicable cloud service 130) creates two queues at initialization time, one that accepts node-specific messages and another that accepts generic messages addressed to any node of a particular type. This allows both specific node control as well as orchestration of the cloud service without limiting the particular implementation of a node. In an embodiment in which these message queues are bridged to an API, the API can act as a consumer, server, or publisher.

Figure 5A:
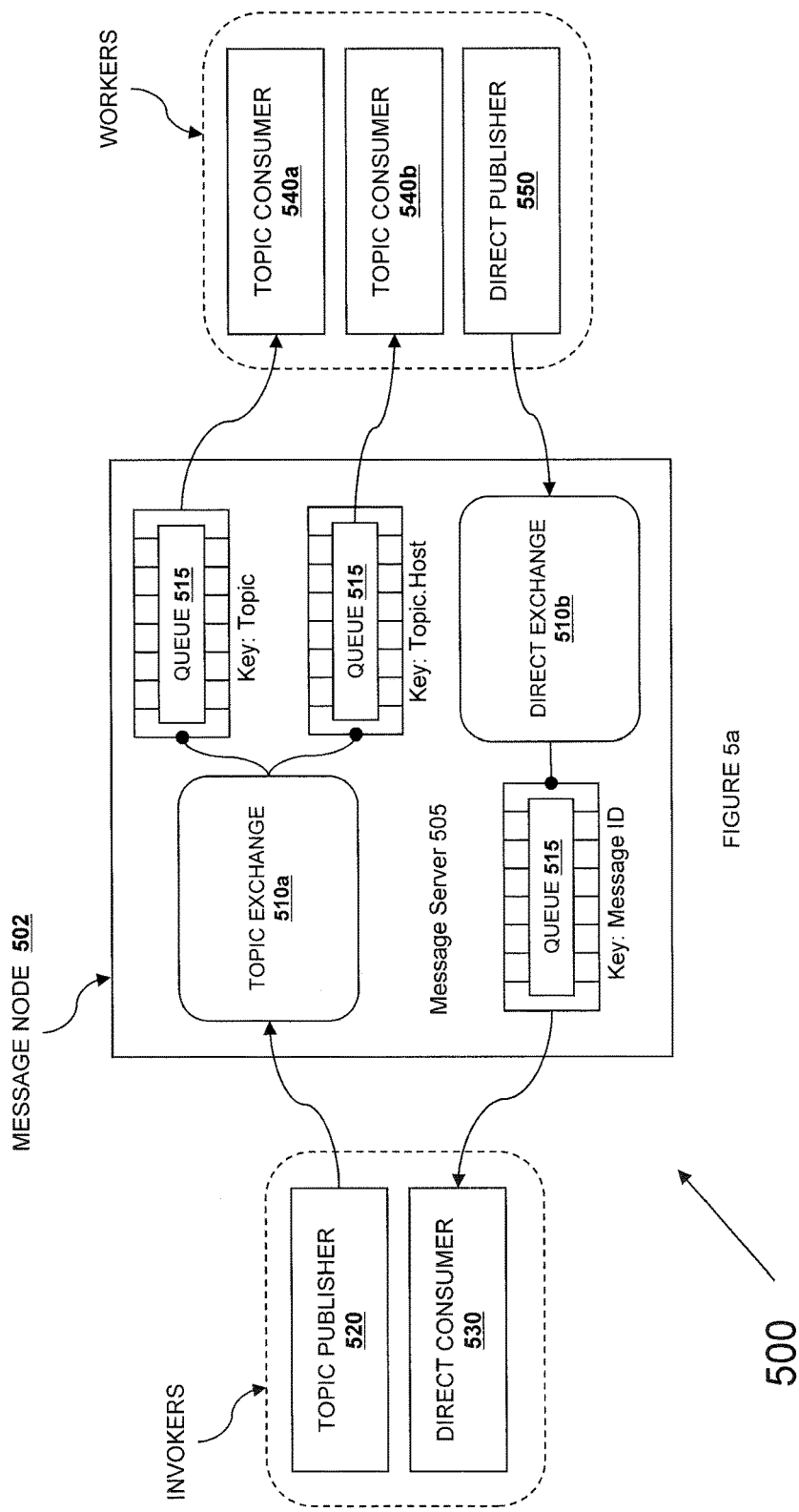
FIG. 5*a* shows a message service system according to various embodiments.

Turning now to FIG. 5a, one implementation of a message service 140 is shown at reference number 500. For simplicity of description, FIG. 5a shows the message service 500 when a single instance 502 is deployed and shared in the cloud computing system 110, but the message service 500 can be either centralized or fully distributed.

In one embodiment, the message service 500 keeps traffic associated with different queues or routing keys separate, so that disparate services can use the message service without interfering with each other. Accordingly, the message queue service may be used to communicate messages between network elements, between cloud services 130, between cloud controllers 120, between network elements, or between any group of sub-elements within the above. More than one message service 500 may be used, and a cloud service 130 may use its own message service as required.

For clarity of exposition, access to the message service 500 will be described in terms of "Invokers" and "Workers," but these labels are purely expository and are not intended to convey a limitation on purpose; in some embodiments, a single component (such as a VM) may act first as an Invoker, then as a Worker, the other way around, or simultaneously in each role. An Invoker is a component that sends messages in the system via two operations: 1) an RPC (Remote Procedure Call) directed message and ii) an RPC broadcast. A Worker is a component that receives messages from the message system and replies accordingly.

In one embodiment, there is a message server 505 including one or more exchanges 510. In a second embodiment, the message system is "brokerless," and one or more exchanges are located at each client. The exchanges 510 act as internal message routing elements so that components interacting with the message service 500 can send and receive messages. In one embodiment, these exchanges are subdivided further into a topic exchange 510*a* and a direct exchange 510*b*. An exchange 510 is a routing structure or system that exists in a particular context. In a currently preferred embodiment, multiple contexts can be included within a single message service with each one acting independently of the others. In one embodiment, the type of exchange, such as a topic exchange 510*a* vs. direct exchange 510*b* determines the routing policy. In a second embodiment, the routing policy is determined via a series of routing rules evaluated by the exchange 510.

The direct exchange 510*b* is a routing element created during or for RPC directed message operations. In one embodiment, there are many instances of a direct exchange 510*b* that are created as needed for the message service 500. In a further embodiment, there is one direct exchange 510*b* created for each RPC directed message received by the system.

The topic exchange 510*a* is a routing element created during or for RPC directed broadcast operations. In one simple embodiment, every message received by the topic exchange is received by every other connected component. In a second embodiment, the routing rule within a topic exchange is described as publish-subscribe, wherein different components can specify a discriminating function and only topics matching the discriminator are passed along. In one embodiment, there are many instances of a topic exchange 510*a* that are created as needed for the message service 500. In one embodiment, there is one topic-based exchange for every topic created in the cloud computing system. In a second embodiment, there are a set number of topics that have pre-created and persistent topic exchanges 510*a*.

Within one or more of the exchanges 510, it may be useful to have a queue element 515. A queue 515 is a message stream; messages sent into the stream are kept in the queue 515 until a consuming component connects to the queue and fetches the message. A queue 515 can be shared or can be exclusive. In one embodiment, queues with the same topic are shared amongst Workers subscribed to that topic.

In a typical embodiment, a queue 515 will implement a FIFO policy for messages and ensure that they are delivered in the same order that they are received. In other embodiments, however, a queue 515 may implement other policies, such as LIFO, a priority queue (highest-priority messages are delivered first), or age (oldest objects in the queue are delivered first), or other configurable delivery policies. In other embodiments, a queue 515 may or may not make any guarantees related to message delivery or message persistence.

In one embodiment, element 520 is a topic publisher. A topic publisher 520 is created, instantiated, or awakened when an RPC directed message or an RPC broadcast operation is executed; this object is instantiated and used to push a message to the message system. Every publisher connects always to the same topic-based exchange; its life-cycle is limited to the message delivery.

In one embodiment, element 530 is a direct consumer. A direct consumer 530 is created, instantiated, or awakened if an RPC directed message operation is executed; this component is instantiated and used to receive a response message from the queuing system. Every direct consumer 530 connects to a unique direct-based exchange via a unique exclusive queue, identified by a UUID or other unique name. The life-cycle of the direct consumer 530 is limited to the message delivery. In one embodiment, the exchange and queue identifiers are included the message sent by the topic publisher 520 for RPC directed message operations.

In one embodiment, elements 540 (elements 540*a* and 540*b*) are topic consumers. In one embodiment, a topic consumer 540 is created, instantiated, or awakened at system start. In a second embodiment, a topic consumer 540 is created, instantiated, or awakened when a topic is registered with the message system 500. In a third embodiment, a topic consumer 540 is created, instantiated, or awakened at the same time that a Worker or Workers are instantiated and persists as long as the associated Worker or Workers have not been destroyed. In this embodiment, the topic consumer 540 is used to receive messages from the queue and it invokes the appropriate action as defined by the Worker role. A topic consumer 540 connects to the topic-based exchange either via a shared queue or via a unique exclusive queue. In one embodiment, every Worker has two associated topic consumers 540, one that is addressed only during an RPC broadcast operations (and it connects to a shared queue whose exchange key is defined by the topic) and the other that is addressed only during an RPC directed message operations, connected to a unique queue whose with the exchange key is defined by the topic and the host.

In one embodiment, element 550 is a direct publisher. In one embodiment, a direct publisher 550 is created, instantiated, or awakened for RPC directed message operations and it is instantiated to return the message required by the request/response operation. The object connects to a direct-based exchange whose identity is dictated by the incoming message.

Turning now to FIG. 5*b*, one embodiment of the process of sending an RPC directed message is shown relative to the elements of the message system 500 as described relative to FIG. 5*a*. All elements are as described above relative to FIG. 5*a* unless described otherwise. At step 560, a topic publisher 520 is instantiated. At step 561, the topic publisher 520 sends a message to an exchange 510*a*. At step 562, a direct consumer 530 is instantiated to wait for the response message. At step 563, the message is dispatched by the exchange 510*a*. At step 564, the message is fetched by the topic consumer 540 dictated by the routing key (either by topic or by topic and host). At step 565, the message is passed to a Worker associated with the topic consumer 540. If needed, at step 566, a direct publisher 550 is instantiated to send a response message via the message system 500. At step 567, the direct publisher 540 sends a message to an exchange 510*b*. At step 568, the response message is dispatched by the exchange 510*b*. At step 569, the response message is fetched by the direct consumer 530 instantiated to receive the response and dictated by the routing key. At step 570, the message response is passed to the Invoker.

Turning now to FIG. 5*c*, one embodiment of the process of sending an RPC broadcast message is shown relative to the elements of the message system 500 as described relative to FIG. 5*a*. All elements are as described above relative to FIG. 5*a* unless described otherwise. At step 580, a topic publisher 520 is instantiated. At step 581, the topic publisher 520 sends a message to an exchange 510*a*. At step 582, the message is dispatched by the exchange 510*a*. At step 583, the message is fetched by a topic consumer 540 dictated by the routing key (either by topic or by topic and host). At step 584, the message is passed to a Worker associated with the topic consumer 540.

In some embodiments, a response to an RPC broadcast message can be requested. In that case, the process follows the steps outlined relative to FIG. 5*b* to return a response to the Invoker.

Rule Engine

Because many aspects of the cloud computing system do not allow direct access to the underlying hardware or services, many aspects of the cloud computing system are handled declaratively, through rule-based computing. Rule-based computing organizes statements into a data model that can be used for deduction, rewriting, and other inferential or transformational tasks. The data model can then be used to represent some problem domain and reason about the objects in that domain and the relations between them. In one embodiment, one or more controllers or services have an associated rule processor that performs rule-based deduction, inference, and reasoning.

Rule Engines can be implemented similarly to instruction processors as described relative to FIG. 3, and may be implemented as a sub-module of a instruction processor where needed. In other embodiments, Rule Engines can be implemented as discrete components, for example as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-rule-engine facility. For example, one embodiment uses a language runtime as a rule engine, running as a discrete operating environment, as a process in an active operating environment, or can be run from a low-power embedded processor. In a second embodiment, the rule engine takes the form of a series of interoperating but discrete components, some or all of which may be implemented as software programs. In another embodiment, the rule engine is a discrete component, using a small amount of flash and a low power processor, such as a low-power ARM processor.

Security and Access Control

One subset of rule-based systems is role-based computing systems. A role-based computing system is a system in which identities and resources are managed by aggregating them into "roles" based on job functions, physical location, legal controls, and other criteria. These roles can be used to model organizational structures, manage assets, or organize data. By arranging roles and the associated rules into graphs or hierarchies, these roles can be used to reason about and manage various resources.

In one application, role-based strategies have been used to form a security model called Role-Based Access Control (RBAC). RBAC associates special rules, called "permissions," with roles; each role is granted only the minimum permissions necessary for the performance of the functions associated with that role. Identities are assigned to roles, giving the users and other entities the permissions necessary to accomplish job functions. RBAC has been formalized mathematically by NIST and accepted as a standard by ANSI. American National Standard 359-2004 is the information technology industry consensus standard for RBAC, and is incorporated herein by reference in its entirety.

Because the cloud computing systems are designed to be multi-tenant, it is necessary to include limits and security in the basic architecture of the system. In one preferred embodiment, this is done through rules declaring the existence of users, resources, projects, and groups. Rule-based access controls govern the use and interactions of these logical entities.

In a preferred embodiment, a user is defined as an entity that will act in one or more roles. A user is typically associated with an internal or external entity that will interact with the cloud computing system in some respect. A user can have multiple roles simultaneously. In one embodiment of the system, a user's roles define which API commands that user can perform.

In a preferred embodiment, a resource is defined as some object to which access is restricted. In various embodiments, resources can include network or user access to a virtual machine or virtual device, the ability to use the computational abilities of a device, access to storage, an amount of storage, API access, ability to configure a network, ability to access a network, network bandwidth, network speed, network latency, ability to access or set authentication rules, ability to access or set rules regarding resources, etc. In general, any item which may be restricted or metered is modeled as a resource.

In one embodiment, resources may have quotas associated with them. A quota is a rule limiting the use or access to a resource. A quota can be placed on a per-project level, a per-role level, a per-user level, or a per-group level. In one embodiment, quotas can be applied to the number of volumes which can be created, the total size of all volumes within a project or group, the number of instances which can be launched, both total and per instance type, the number of processor cores which can be allocated, and publicly accessible IP addresses. Other restrictions are also contemplated as described herein.

In a preferred embodiment, a project is defined as a flexible association of users, acting in certain roles, with defined access to various resources. A project is typically defined by an administrative user according to varying demands. There may be templates for certain types of projects, but a project is a logical grouping created for administrative purposes and may or may not bear a necessary relation to anything outside the project. In a preferred embodiment, arbitrary roles can be defined relating to one or more particular projects only.

In a preferred embodiment, a group is defined as a logical association of some other defined entity. There may be groups of users, groups of resources, groups of projects, groups of quotas, or groups which contain multiple different types of defined entities. For example, in one embodiment, a group "development" is defined. The development group may include a group of users with the tag "developers" and a group of virtual machine resources ("developer machines"). These may be connected to a developer-only virtual network ("devnet"). The development group may have a number of ongoing development projects, each with an associated "manager" role. There may be per-user quotas on storage and a group-wide quota on the total monthly bill associated with all development resources.

The applicable set of rules, roles, and quotas is based upon context. In one embodiment, there are global roles, user-specific roles, project-specific roles, and group-specific roles. In one embodiment, a user's actual permissions in a particular project are the intersection of the global roles, user-specific roles, project-specific roles, and group-specific roles associated with that user, as well as any rules associated with project or group resources possibly affected by the user.

In one preferred embodiment, authentication of a user is performed through public/private encryption, with keys used to authenticate particular users, or in some cases, particular resources such as particular machines. A user or machine may have multiple keypairs associated with different roles, projects, groups, or permissions. For example, a different key may be needed for general authentication and for project access. In one such embodiment, a user is identified within the system by the possession and use of one or more cryptographic keys, such as an access and secret key. A user's access key needs to be included in a request, and the request must be signed with the secret key. Upon receipt of API requests, the rules engine verifies the signature and executes commands on behalf of the user.

Some resources, such as virtual machine images, can be shared by many users. Accordingly, it can be impractical or insecure to include private cryptographic information in association with a shared resource. In one embodiment, the system supports providing public keys to resources dynamically. In one exemplary embodiment, a public key, such as an SSH key, is injected into a VM instance before it is booted. This allows a user to login to the instances securely, without sharing private key information and compromising security. Other shared resources that require per-instance authentication are handled similarly.

In one embodiment, a rule processor is also used to attach and evaluate rule-based restrictions on non-user entities within the system. In this embodiment, a "Cloud Security Group" (or just "security group") is a named collection of access rules that apply to one or more non-user entities. Typically these will include network access rules, such as firewall policies, applicable to a resource, but the rules may apply to any resource, project, or group. For example, in one embodiment a security group specifies which incoming network traffic should be delivered to all VM instances in the group, all other incoming traffic being discarded. Users with the appropriate permissions (as defined by their roles) can modify rules for a group. New rules are automatically enforced for all running instances and instances launched from then on.

When launching VM instances, a project or group administrator specifies which security groups it wants the VM to join. If the directive to join the groups has been given by an administrator with sufficient permissions, newly launched VMs will become a member of the specified security groups when they are launched. In one embodiment, an instance is assigned to a "default" group if no groups are specified. In a further embodiment, the default group allows all network traffic from other members of this group and discards traffic from other IP addresses and groups. The rules associated with the default group can be modified by users with roles having the appropriate permissions.

In some embodiments, a security group is similar to a role for a non-user, extending RBAC to projects, groups, and resources. For example, one rule in a security group can stipulate that servers with the "webapp" role must be able to connect to servers with the "database" role on port 3306. In some embodiments, an instance can be launched with membership of multiple security groups—similar to a server with multiple roles. Security groups are not necessarily limited, and can be equally expressive as any other type of RBAC security. In one preferred embodiment, all rules in security groups are ACCEPT rules, making them easily composable.

In one embodiment, each rule in a security group must specify the source of packets to be allowed. This can be specified using CIDR notation (such as 10.22.0.0/16, representing a private subnet in the 10.22 IP space, or 0.0.0.0/0 representing the entire Internet) or another security group. The creation of rules with other security groups specified as sources helps deal with the elastic nature of cloud computing; instances are impermanent and IP addresses frequently change. In this embodiment, security groups can be maintained dynamically without having to adjust actual IP addresses.

In one embodiment, the APIs, RBAC-based authentication system, and various specific roles are used to provide a US eAuthentication-compatible federated authentication system to achieve access controls and limits based on traditional operational roles. In a further embodiment, the implementation of auditing APIs provides the necessary environment to receive a certification under FIPS 199 Moderate classification for a hybrid cloud environment.

In an embodiment as described above, APIs are extended with three additional type declarations, mapping to the "Confidentiality, Integrity, Availability" ("C.I.A.") classifications of FIPS 199. These additional parameters would also apply to creation of block storage volumes and creation of object storage "buckets." C.I.A. classifications on a bucket would be inherited by the keys within the bucket. Establishing declarative semantics for individual API calls allows the cloud environment to seamlessly proxy API calls to external, third-party vendors when the requested C.I.A. levels match.

In one embodiment, a hybrid or multi-vendor cloud uses the VLAN DHCP networking architecture described relative to FIG. 4 and the RBAC controls to manage and secure inter-cluster networking. In this way the hybrid cloud environment provides dedicated, potentially co-located physical hardware with a network interconnect to the project or users' cloud virtual network.

In one embodiment, the interconnect is a bridged VPN connection. In one embodiment, there is a VPN server at each side of the interconnect with a unique shared certificate. A security group is created specifying the access at each end of the bridged connection. In a second embodiment, the interconnect VPN implements audit controls so that the connections between each side of the bridged connection can be queried and controlled. Network discovery protocols (ARP, CDP) can be used to provide information directly, and existing protocols (SNMP location data, DNS LOC records) overloaded to provide audit information.

In the disclosure that follows, the information processing devices as described relative to FIG. 2 and the clusters as described relative to FIG. 3 are used as underlying infrastructure to build and administer various cloud services. Except where noted specifically, either a single information processing device or a cluster can be used interchangeably to implement a single "node," "service," or "controller." Where a plurality of resources are described, such as a plurality of storage nodes or a plurality of compute nodes, the plurality of resources can be implemented as a plurality of information processing devices, as a one-to-one relationship of information processing devices, logical containers, and operating environments, or in an M×N relationship of information processing devices to logical containers and operating environments.

Various aspects of the services implemented in the cloud computing system may be referred to as "virtual machines"

or "virtual devices"; as described above, those refer to a particular logical container and operating environment, configured to perform the service described. The term "instance" is sometimes used to refer to a particular virtual machine running inside the cloud computing system. An "instance type" describes the compute, memory and storage capacity of particular VM instances.

Within the architecture described above, various services are provided, and different capabilities can be included through a plug-in architecture. Although specific services and plugins are detailed below, these disclosures are intended to be representative of the services and plugins available for integration across the entire cloud computing system 110.

Figure 6:
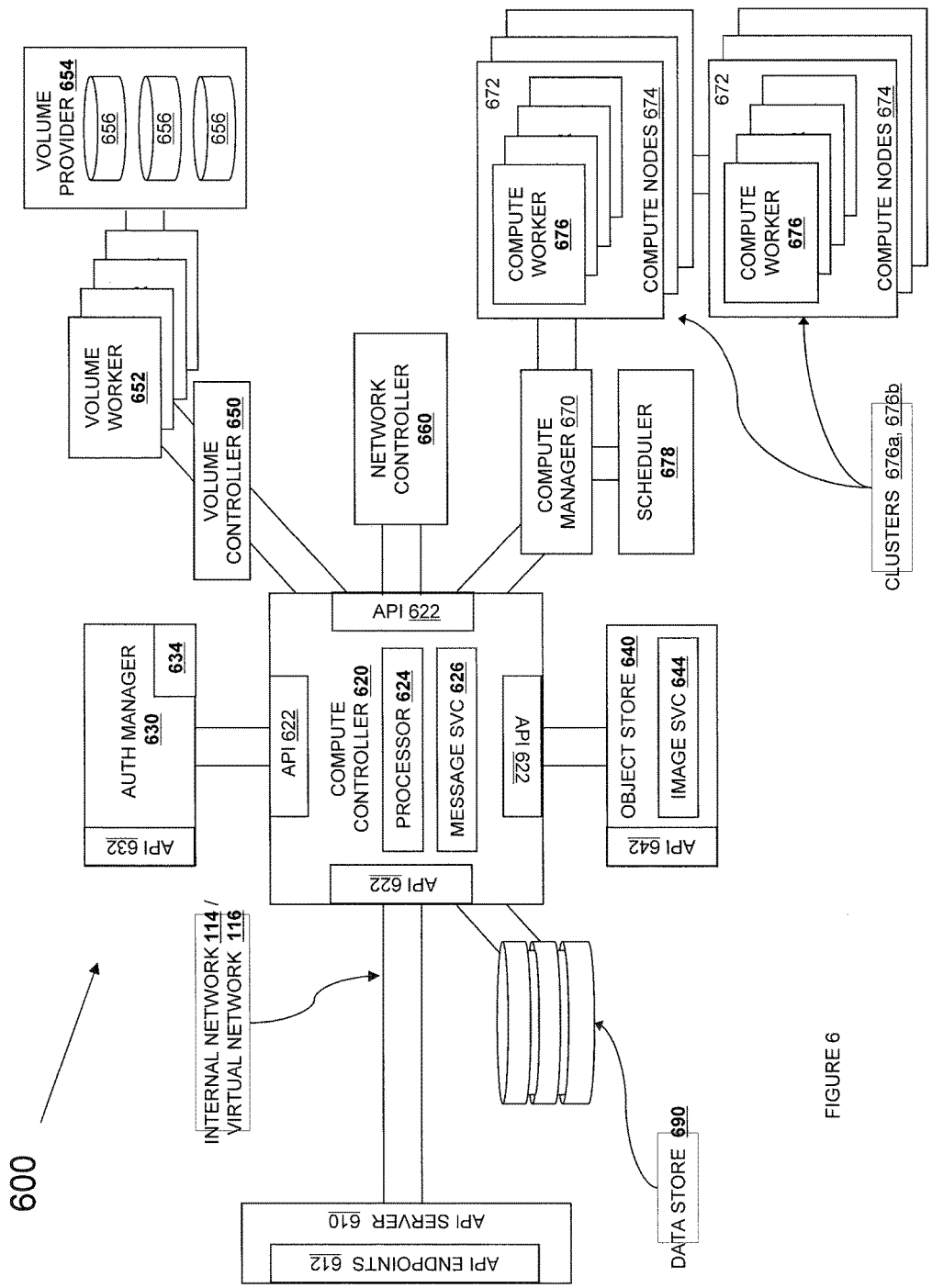
FIG. 6 shows IaaS-style computational cloud service according to various embodiments.

Turning now to FIG. 6, an IaaS-style computational cloud service (a "compute" service) is shown at 600 according to one embodiment. This is one embodiment of a cloud controller 120 with associated cloud service 130 as described relative to FIG. 1. Except as described relative to specific embodiments, the existence of a compute service does not require or prohibit the existence of other portions of the cloud computing system 110 nor does it require or prohibit the existence of other cloud controllers 120 with other respective services 130.

To the extent that some components described relative to the compute service 600 are similar to components of the larger cloud computing system 110, those components may be shared between the cloud computing system 110 and the compute service 600, or they may be completely separate. Further, to the extend that "controllers," "nodes," "servers," "managers," "VMs," or similar terms are described relative to the compute service 600, those can be understood to comprise any of a single information processing device 210 as described relative to FIG. 2, multiple information processing devices 210, a single VM as described relative to FIG. 2, a group or cluster of VMs or information processing devices as described relative to FIG. 3. These may run on a single machine or a group of machines, but logically work together to provide the described function within the system.

In one embodiment, compute service 600 includes an API Server 610, a Compute Controller 620, an Auth Manager 630, an Object Store 640, a Volume Controller 650, a Network Controller 660, and a Compute Manager 670. These components are coupled by a communications network of the type previously described. In one embodiment, communications between various components are message-oriented, using HTTP or a messaging protocol such as AMQP, ZeroMQ, or STOMP.

Although various components are described as "calling" each other or "sending" data or messages, one embodiment makes the communications or calls between components asynchronous with callbacks that get triggered when responses are received. This allows the system to be architected in a "shared-nothing" fashion. To achieve the shared-nothing property with multiple copies of the same component, compute service 600 further includes distributed data store 690. Global state for compute service 600 is written into this store using atomic transactions when required. Requests for system state are read out of this store. In some embodiments, results are cached within controllers for short periods of time to improve performance. In various embodiments, the distributed data store 690 can be the same as, or share the same implementation as Object Store 640.

In one embodiment, the API server 610 includes external API endpoints 612. In one embodiment, the external API endpoints 612 are provided over an RPC-style system, such as CORBA, DCE/COM, SOAP, or XML-RPC. These follow the calling structure and conventions defined in their respective standards. In another embodiment, the external API endpoints 612 are basic HTTP web services following a REST pattern and identifiable via URL. Requests to read a value from a resource are mapped to HTTP GETs, requests to create resources are mapped to HTTP PUTs, requests to update values associated with a resource are mapped to HTTP POSTs, and requests to delete resources are mapped to HTTP DELETEs. In some embodiments, other REST-style verbs are also available, such as the ones associated with WebDav. In a third embodiment, the API endpoints 612 are provided via internal function calls, IPC, or a shared memory mechanism. Regardless of how the API is presented, the external API endpoints 612 are used to handle authentication, authorization, and basic command and control functions using various API interfaces. In one embodiment, the same functionality is available via multiple APIs, including APIs associated with other cloud computing systems. This enables API compatibility with multiple existing tool sets created for interaction with offerings from other vendors.

The Compute Controller 620 coordinates the interaction of the various parts of the compute service 600. In one embodiment, the various internal services that work together to provide the compute service 600, are internally decoupled by adopting a service-oriented architecture (SOA). The Compute Controller 620 serves as an internal API server, allowing the various internal controllers, managers, and other components to request and consume services from the other components. In one embodiment, all messages pass through the Compute Controller 620. In a second embodiment, the Compute Controller 620 brings up services and advertises service availability, but requests and responses go directly between the components making and serving the request. In a third embodiment, there is a hybrid model in which some services are requested through the Compute Controller 620, but the responses are provided directly from one component to another.

In one embodiment, communication to and from the Compute Controller 620 is mediated via one or more internal API endpoints 622, provided in a similar fashion to those discussed above. The internal API endpoints 622 differ from the external API endpoints 612 in that the internal API endpoints 622 advertise services only available within the overall compute service 600, whereas the external API endpoints 612 advertise services available outside the compute service 600. There may be one or more internal APIs 622 that correspond to external APIs 612, but it is expected that there will be a greater number and variety of internal API calls available from the Compute Controller 620.

In one embodiment, the Compute Controller 620 includes an instruction processor 624 for receiving and processing instructions associated with directing the compute service 600. For example, in one embodiment, responding to an API call involves making a series of coordinated internal API calls to the various services available within the compute service 600, and conditioning later API calls on the outcome or results of earlier API calls. The instruction processor 624 is the component within the Compute Controller 620 responsible for marshalling arguments, calling services, and making conditional decisions to respond appropriately to API calls.

In one embodiment, the instruction processor 624 is implemented as described above relative to FIG. 3, specifically as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor 624, running as a discrete operating environment, as a process in an active operating environment, or can be run from a low-power embedded processor. In a second embodiment, the instruction processor 624 takes the form of a series of interoperating but discrete components, some or all of which may be implemented as software programs. In another embodiment, the instruction processor 624 is a discrete component, using a small amount of flash and a low power processor, such as a low-power ARM processor. In a further embodiment, the instruction processor includes a rule engine as a submodule as described herein.

In one embodiment, the Compute Controller 620 includes a message queue as provided by message service 626. In accordance with the service-oriented architecture described above, the various functions within the compute service 600 are isolated into discrete internal services that communicate with each other by passing data in a well-defined, shared format, or by coordinating an activity between two or more services. In one embodiment, this is done using a message queue as provided by message service 626. The message service 626 brokers the interactions between the various services inside and outside the Compute Service 600.

In one embodiment, the message service 626 is implemented similarly to the message service described relative to FIGS. 5a-5c. The message service 626 may use the message service 140 directly, with a set of unique exchanges, or may use a similarly configured but separate service.

The Auth Manager 630 provides services for authenticating and managing user, account, role, project, group, quota, and security group information for the compute service 600. In a first embodiment, every call is necessarily associated with an authenticated and authorized entity within the system, and so is or can be checked before any action is taken. In another embodiment, internal messages are assumed to be authorized, but all messages originating from outside the service are suspect. In this embodiment, the Auth Manager checks the keys provided associated with each call received over external API endpoints 612 and terminates and/or logs any call that appears to come from an unauthenticated or unauthorized source. In a third embodiment, the Auth Manager 630 is also used for providing resource-specific information such as security groups, but the internal API calls for that information are assumed to be authorized. External calls are still checked for proper authentication and authorization. Other schemes for authentication and authorization can be implemented by flagging certain API calls as needing verification by the Auth Manager 630, and others as needing no verification.

In one embodiment, external communication to and from the Auth Manager 630 is mediated via one or more authentication and authorization API endpoints 632, provided in a similar fashion to those discussed above. The authentication and authorization API endpoints 632 differ from the external API endpoints 612 in that the authentication and authorization API endpoints 632 are only used for managing users, resources, projects, groups, and rules associated with those entities, such as security groups, RBAC roles, etc. In another embodiment, the authentication and authorization API endpoints 632 are provided as a subset of external API endpoints 612.

In one embodiment, the Auth Manager 630 includes a rules processor 634 for processing the rules associated with the different portions of the compute service 600. In one embodiment, this is implemented in a similar fashion to the instruction processor 624 described above.

The Object Store 640 provides redundant, scalable object storage capacity for arbitrary data used by other portions of the compute service 600. At its simplest, the Object Store 640 can be implemented one or more block devices exported over the network. In a second embodiment, the Object Store 640 is implemented as a structured, and possibly distributed data organization system. Examples include relational database systems—both standalone and clustered—as well as non-relational structured data storage systems like MongoDB, Apache Cassandra, or Redis. In a third embodiment, the Object Store 640 is implemented as a redundant, eventually consistent, fully distributed data storage service.

In one embodiment, external communication to and from the Object Store 640 is mediated via one or more object storage API endpoints 642, provided in a similar fashion to those discussed above. In one embodiment, the object storage API endpoints 642 are internal APIs only. In a second embodiment, the Object Store 640 is provided by a separate cloud service 130, so the "internal" API used for compute service 600 is the same as the external API provided by the object storage service itself.

In one embodiment, the Object Store 640 includes an Image Service 644. The Image Service 644 is a lookup and retrieval system for virtual machine images. In one embodiment, various virtual machine images can be associated with a unique project, group, user, or name and stored in the Object Store 640 under an appropriate key. In this fashion multiple different virtual machine image files can be provided and programmatically loaded by the compute service 600.

The Volume Controller 650 coordinates the provision of block devices for use and attachment to virtual machines. In one embodiment, the Volume Controller 650 includes Volume Workers 652. The Volume Workers 652 are implemented as unique virtual machines, processes, or threads of control that interact with one or more backend volume providers 654 to create, update, delete, manage, and attach one or more volumes 656 to a requesting VM.

In a first embodiment, the Volume Controller 650 is implemented using a SAN that provides a sharable, network-exported block device that is available to one or more VMs, using a network block protocol such as iSCSI. In this embodiment, the Volume Workers 652 interact with the SAN to manage and iSCSI storage to manage LVM-based instance volumes, stored on one or more smart disks or independent processing devices that act as volume providers 654 using their embedded storage 656. In a second embodiment, disk volumes 656 are stored in the Object Store 640 as image files under appropriate keys. The Volume Controller 650 interacts with the Object Store 640 to retrieve a disk volume 656 and place it within an appropriate logical container on the same information processing system 240 that contains the requesting VM. An instruction processing module acting in concert with the instruction processor and hypervisor on the information processing system 240 acts as the volume provider 654, managing, mounting, and unmounting the volume 656 on the requesting VM. In a further embodiment, the same volume 656 may be mounted on two or more VMs, and a block-level replication facility may be used to synchronize changes that occur in multiple places. In a third embodiment, the Volume Controller 650 acts as a block-device proxy for the Object Store 640, and directly exports a view of one or more portions of the Object Store 640 as a volume. In this embodiment, the volumes are simply views onto portions of the Object Store 640, and the Volume Workers 654 are part of the internal implementation of the Object Store 640.

In one embodiment, the Network Controller 660 manages the networking resources for VM hosts managed by the compute manager 670. Messages received by Network Controller 660 are interpreted and acted upon to create, update, and manage network resources for compute nodes within the compute service, such as allocating fixed IP addresses, configuring VLANs for projects or groups, or configuring networks for compute nodes.

In one embodiment, the Network Controller 660 is implemented similarly to the network controller described relative to FIGS. 4*a* and 4*b*. The network controller 660 may use a shared cloud controller directly, with a set of unique addresses, identifiers, and routing rules, or may use a similarly configured but separate service.

In one embodiment, the Compute Manager 670 manages computing instances for use by API users using the compute service 600. In one embodiment, the Compute Manager 670 is coupled to a plurality of resource pools 672, each of which includes one or more compute nodes 674. Each compute node 674 is a virtual machine management system as described relative to FIG. 3 and includes a compute worker 676, a module working in conjunction with the hypervisor and instruction processor to create, administer, and destroy multiple user- or system-defined logical containers and operating environments—VMs—according to requests received through the API. In various embodiments, the pools of compute nodes may be organized into clusters, such as clusters 676*a* and 676*b*. In one embodiment, each resource pool 672 is physically located in one or more data centers in one or more different locations. In another embodiment, resource pools have different physical or software resources, such as different available hardware, higher-throughput network connections, or lower latency to a particular location.

In one embodiment, the Compute Manager 670 allocates VM images to particular compute nodes 674 via the Market Scheduler 678. The Market Scheduler 678 is a market-based matching service; requests for the creation of new VM instances come in and the most applicable Compute nodes 674 are selected from the pool of potential candidates. The process for matching a particular VM instance request with an applicable compute node is described in detail in the next section.

Of particular note, the allocation of virtual machines to a particular physical host is a problem that is not limited by the particular aspects described above. For example, a "shared hosting" provider could use a similar market allocation procedure as described below to allocate accounts across different hosts. An object storage provider could use a market allocation procedure to allocate object locations or account locations across physical disk space hosts. The particular allocation procedure is provided for clarity and context, but the allocation procedures are not limited to the cloud system described herein.

Figure 7:
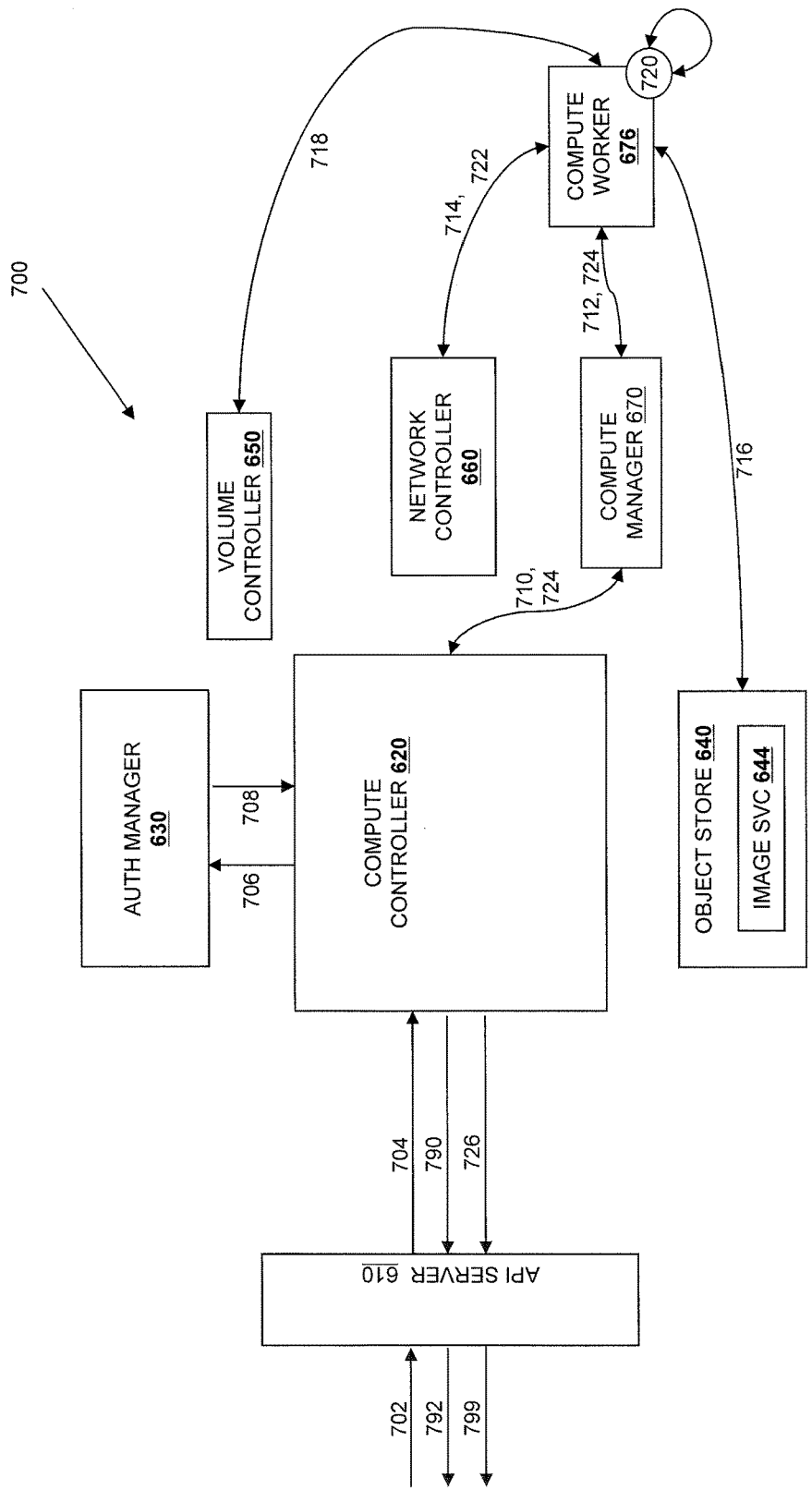
FIG. 7 shows an instantiating and launching process for virtual resources according to various embodiments.

Turning now to FIG. 7, a diagram showing one embodiment of the process of instantiating and launching a VM instance is shown as diagram 700. In one embodiment, this corresponds to steps 458 and/or 459 in FIG. 4*b*. Although the implementation of the image instantiating and launching process will be shown in a manner consistent with the embodiment of the compute service 600 as shown relative to FIG. 6, the process is not limited to the specific functions or elements shown in FIG. 6. For clarity of explanation, internal details not relevant to diagram 700 have been removed from the diagram relative to FIG. 6. Further, while some requests and responses are shown in terms of direct component-to-component messages, in at least one embodiment the messages are sent via a message service, such as message service 626 as described relative to FIG. 6.

At time 702, the API Server 610 receives a request to create and run an instance with the appropriate arguments. In one embodiment, this is done by using a command-line tool that issues arguments to the API server 610. In a second embodiment, this is done by sending a message to the API Server 610. In one embodiment, the API to create and run the instance includes arguments specifying a resource type, a resource image, and control arguments. A further embodiment includes requester information and is signed and/or encrypted for security and privacy. At time 704, API server 610 accepts the message, examines it for API compliance, and relays a message to Compute Controller 620, including the information needed to service the request. In an embodiment in which user information accompanies the request, either explicitly or implicitly via a signing and/or encrypting key or certificate, the Compute Controller 620 sends a message to Auth Manager 630 to authenticate and authorize the request at time 706 and Auth Manager 630 sends back a response to Compute Controller 620 indicating whether the request is allowable at time 708. If the request is allowable, a message is sent to the Compute Manager 670 to instantiate the requested resource at time 710. At time 712, the Compute Manager selects a Compute Worker 676 using the Market Scheduler and sends a message to the selected Worker to instantiate the requested resource. At time 714, Compute Worker identifies and interacts with Network Controller 660 to get a proper VLAN and IP address as described in steps 451-457 relative to FIG. 4. At time 716, the selected Worker 676 interacts with the Object Store 640 and/or the Image Service 644 to locate and retrieve an image corresponding to the requested resource. If requested via the API, or used in an embodiment in which configuration information is included on a mountable volume, the selected Worker interacts with the Volume Controller 650 at time 718 to locate and retrieve a volume for the to-be-instantiated resource. At time 720, the selected Worker 676 uses the available virtualization infrastructure as described relative to FIG. 2 to instantiate the resource, mount any volumes, and perform appropriate configuration. At time 722, selected Worker 676 interacts with Network Controller 660 to configure routing as described relative to step 460 as discussed relative to FIG. 4. At time 724, a message is sent back to the Compute Controller 620 via the Compute Manager 670 indicating success and providing necessary operational details relating to the new resource. At time 726, a message is sent back to the API Server 610 with the results of the operation as a whole. At time 799, the API-specified response to the original command is provided from the API Server 610 back to the originally requesting entity. If at any time a requested operation cannot be performed, then an error is returned to the API Server at time 790 and the API-specified response to the original command is provided from the API server at time 792. For example, an error can be returned if a request is not allowable at time 708, if a VLAN cannot be created or an IP allocated at time 714, if an image cannot be found or transferred at time 716, etc.

In a further embodiment, the transfer of a particular VM from one compute worker 676 to a second compute worker 676 is accomplished using the same process, with the exception that an internal API is used, not the external API exposed by API server 610.

Figure 8:
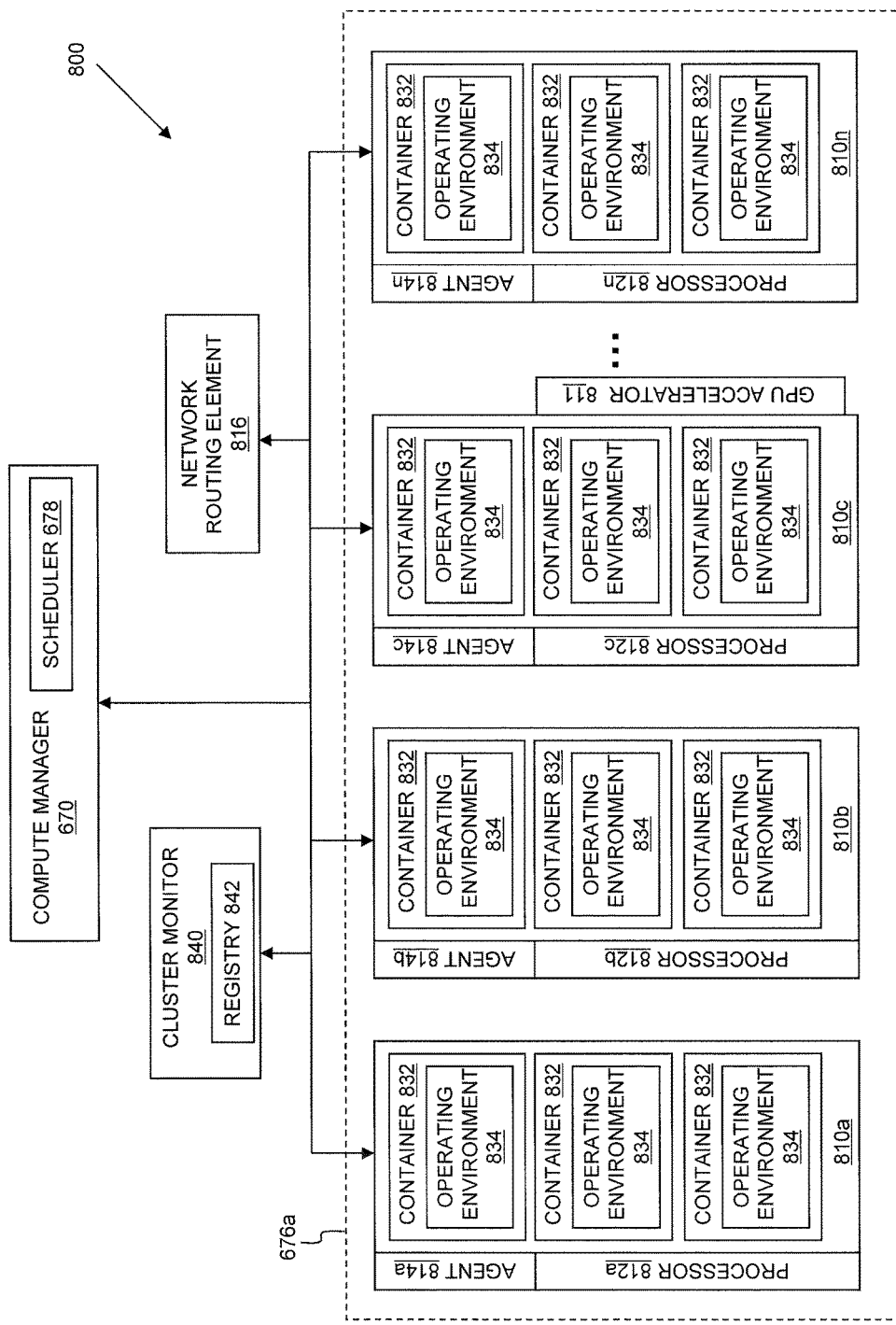
FIG. 8 illustrates a system 800 that includes the compute cluster, the compute manager, and scheduler that were previously discussed in association with FIG. 6.

Turning now to FIG. 8, illustrated is a system 800 that includes the compute cluster 676a, the compute manager 670, and market scheduler 678 that were previously discussed in association with FIG. 6. Note that where particular implementations are similar within the present disclosure, similar names and reference numbers may be used, but such similarity is for clarity only and should not be considered limiting.

In the illustrated embodiment of FIG. 8, the compute cluster 676a includes a plurality of information processing systems (IPS) 810a-810n that are similar to the information processing systems (IPSes) described relative to FIGS. 2 and 3 above. The IPSes may be homogeneous or non-homogeneous depending on the computer hardware utilized to form the compute cluster 676a. For instance, some cloud systems, especially those created within "private" clouds, may be created using repurposed computers or from a large but non-homogenous pool of available computer resources. Thus, the hardware components of the information processing systems 810a-810n, such as processors 812a-812n, may vary significantly.

Each information processing system 810a-810n includes one or more individual virtualization containers 832 with operating environments 834 disposed therein (together referred to as a "virtual machine" or "VM"). As described above, the compute manager 670 allocates VM images to particular information processing systems via the market scheduler 678. For example, as requests for the creation of new VM instances come in, the market scheduler 678 selects the information processing system on which to instantiate the requested VM using the procedures described below. Notably, because the information processing systems in the compute cluster 676a may be non-homogeneous, VM performance varies based on the capabilities of the information processing systems hosting the VM instance. For instance, the information processing system 810c is the sole system that includes a GPU accelerator 811, and this may process graphics-intensive compute jobs more efficiently than other information processing systems. Further, with regard to the network infrastructure of the compute cluster 676a, the bandwidth and network load may vary between information processing systems 810a-810n and individual VMs executing on the IPSs, impacting the network performance of identical VMs.

In more detail, the information processing systems 810a-810n respectively include local agents as described relative to FIGS. 2a and 2b, shown in FIG. 8 as local agents 814a-814n. Local agents 814 are operable to gather metadata about the information processing systems and the VM instances executing thereon. Local agents 814a-814n may be implemented in software or in tailored electrical circuits or as software instructions to be used in conjunction with processors 812a-812n to create a hardware-software combination that implements the specific functionality described herein. To the extent that software is used to implement local agents 814a-814n, the information processing systems 810a-810n may include software instructions stored on non-transitory computer-readable media. In one embodiment, local agents 814a-814b may be hardware-based, out-of-band management controllers coupled to the respective information processing systems 810a-810n. In such an instance, the monitors may communicate with the network of system 800 with a physically separate network interface than their host information processing systems and may be available when the processing systems are not powered-on. In another embodiment, local agents 814a-814b may be software-based, in-band management clients installed on the host operating systems of the information processing systems. In such an embodiment, the monitor clients may only be available when the host information processing systems are powered-on and initialized. In other embodiments, local agents 814a-814n may be any number of various components operable to collect metadata about a host information processing system. In one embodiment, local agents 814a-814n are implemented, at least in part, as IPMI subsystems 240 as described relative to FIG. 2b. In a further embodiment, local agents 814a-814n include an IPMI subsystem 240, but also include further monitoring and computational facilities as described herein.

One aspect of local agents 814a-814n is their monitoring function, used to gather both static metadata and dynamic metadata about the information processing systems 810a-810n. With regard to static metadata, local agents 814a-814n may gather the physical characteristics of the underlying computer such as processor type and speed, memory type and amount, hard disk storage capacity and type, networking interface type and maximum bandwidth, the presence of any peripheral cards such as graphics cards or GPU accelerators, and any other detectable hardware information. In one embodiment, this information is gathered using the IPMI subsystem 240's hardware inventory functionality. In another embodiment, the information is collected using a benchmark as described further below.

With respect to dynamic metadata, local agents 814a-814n may gather operating conditions of the underlying computer such as processor utilization, memory usage, hard disk utilization, networking load and latency, availability and utilization of hardware components such as GPU accelerators. Further, not only do local agents 814a-814n observe the dynamic operating conditions of their respective information processing system as a whole, but, importantly, they also include hooks into individual containers 832 and operating environments 834 so they can also monitor static and dynamic conditions as they appear from "inside" of a VM. For instance, local agent 814a can determine the virtual hardware characteristics of each VM executing on information processing system 810a and also capture network load and latency statistics relative to other VMs on the information processing system and in the same VLAN as they appear to a specific VM. In one embodiment, local agents 814a-814n communicate with agents executing within a VM's operating system to query operational statistics, or, in another embodiment, the monitors gather VM metadata through hypervisor management infrastructure.

As shown in the illustrated embodiment of FIG. 8, the system 800 includes a cluster monitor 840 that is operable to oversee operation of the compute cluster 676a. The cluster monitor 840 includes a registry 842 that stores metadata received from local agents 814a-814n, especially relative to global utilization information that would otherwise not be available from the perspective a single local agent 814. For example, the cluster monitor 840 may collect and maintain information such as network load and latency between the compute cluster and other clusters or points outside of the cloud system 800.

Figure 9A:
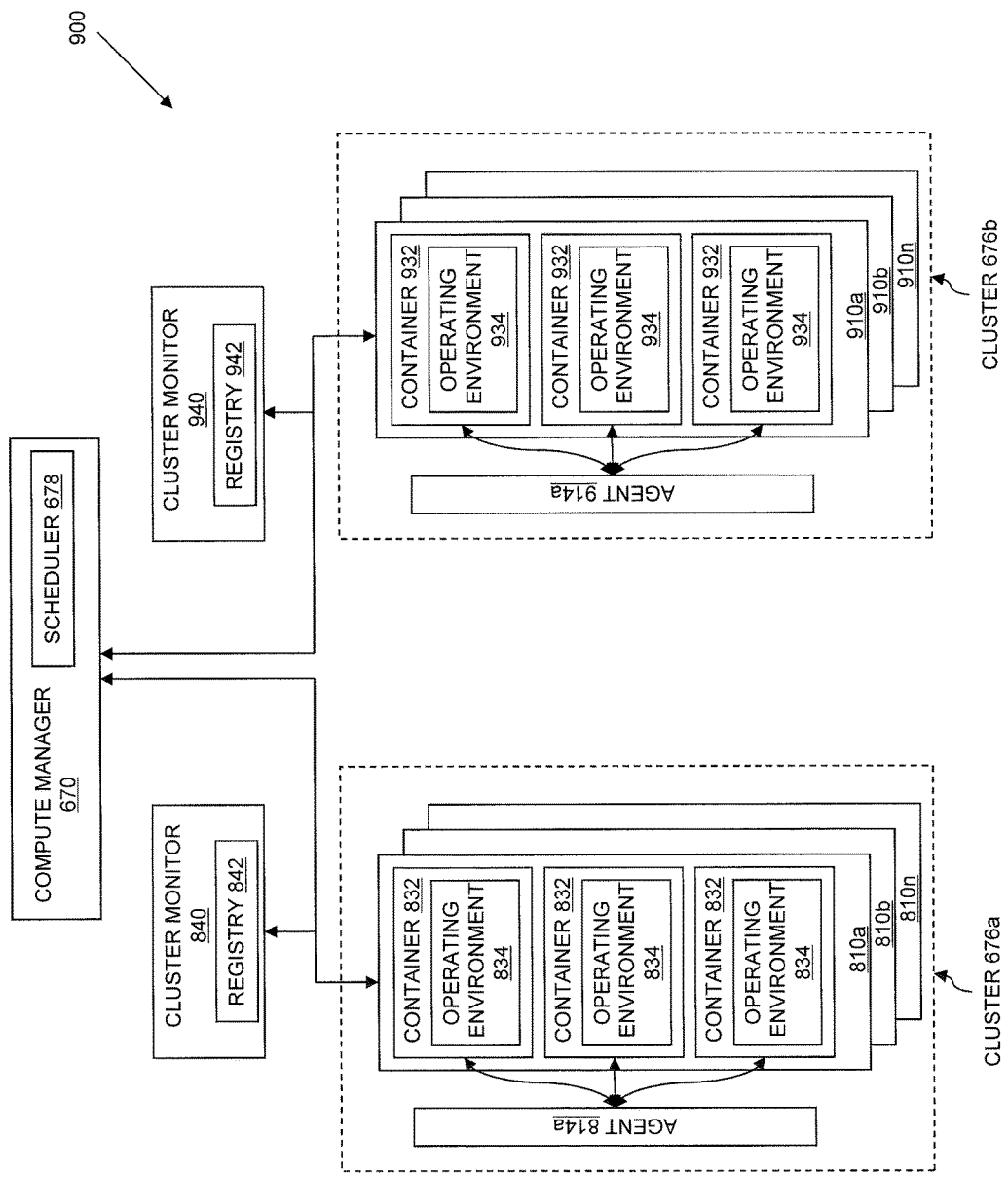
FIG. 9 illustrates a system 900 that is similar to the system of FIG. 8 but also includes a second compute cluster.

With reference now to FIG. 9a, illustrated is a system 900 that is similar to the system 800 of FIG. 8 but also includes the compute cluster 676b. The compute cluster 676b includes a plurality of information processing systems (IPS) 910a-910n that are similar to the information processing systems 810a-810n described in association with FIG. 8.

The IPSes may be homogeneous or non-homogeneous depending on the computer hardware utilized to form the compute cluster 676b. The information processing systems 910a-910n respectively include local agents 914a-914n that are operable to gather metadata about and perform local computation about the information processing systems and the VM instances executing thereon. As shown in the illustrated embodiment of FIG. 9, the system 900 also includes a cluster monitor 940 that is operable to oversee operation of the compute cluster 676b and includes a registry 942 for the storage of metadata received from the monitors 914a-914n. The second cluster 676b may be defined in various ways. In a first embodiment, it is in a different physical location, such as a different datacenter, different room in the same datacenter, or in a different rack from the first cluster 676a. In another embodiment, the physical machines may be intermixed physically but they are separated from each other logically. One possible reason to do this is to adjust to the aging of machines within a datacenter. The first cluster can include a set of machines with specification set "A," and the second cluster can include machines with a specification set "B," where A and B differ because of purchasing decisions, newer hardware, failure rates, SLA requirements, latency, power distribution, temperature, or other distinguishing factors.

Notably, in multi-cluster systems such as system 900, the market scheduler 678 has information from both cluster 676a and 676b and VM allocations may be initially placed in either cluster (consistent with the market allocation procedure described below) and may move between clusters as appropriate. The use of multiple clusters (or multiple zones) in the market scheduling algorithm is described below.

The functioning of the market-based scheduler will be described relative to the figures below. One consistent source of effort in cloud system management has been making the scheduler "smarter" and thus better able to manage the various permutations of loads, machines, and virtual devices that apply in a large cloud system. In doing so, typical schedulers are retreading and expanding on a number of years of operating system research regarding the scheduling of processes and threads. There are challenges associated with scheduling VMs that don't apply operating system contexts, but scheduling virtual workloads on physical devices is conceptually similar in many ways.

Several advantages of various embodiments of the described system will now be described. While not all embodiments may have all of these advantages, the structure of the system allows an embodiment in which each of these advantages can be realized.

One of the best ways to allocate resources when there are multiple independent actors is by using a market, where different entities "buy" and "sell" capacity. In the absence of various market-distorting mechanisms, this independent action has been shown to create an optimal allocation of resources.

Although market-based allocation has been studied before, several differences between the system described herein and existing approaches are apparent. First, because of the lack of truly "intelligent" resources, most existing systems simulate a virtual auction or similar market mechanism to allocate processes, in effect "lending" intelligence to the underlying resource. In contrast, in most embodiments of a cloud computing system, each IPS has computational ability and can make local decisions about optimizing load.

Second, many existing approaches work on the assumption that limited or incorrect information will be broadcast in the market. In many embodiments of the presently-described system, components can be trusted or their behavior verified through direct observation, leading to greater efficiency.

The market scheduler mechanism described herein is applicable to long-running tasks, such as a VM process. Efficient scheduling of a series of short-running tasks can be considered to be an implementation of various box-packing algorithms. Optimal usage is achieved by efficiently allocating lots of small, dynamic tasks across a set of resources. The small nature of each task also for better granularity in scheduling and more even resource usage. Even if a poor allocation is made for one particular task, the long-run impact of that task is minimal. In contrast, a long-running task can have substantial effects over a course of days, months, or even years, making dynamic allocation and rebalancing of tasks a substantial advantage. Further, long-running tasks cannot just be canceled and rescheduled; they have state and availability requirements that must be maintained.

Another advantage of some embodiments is that it allows for tasks to change their resource consumption over time. Models that only allow for static resource consumption are not generally applicable to long-running tasks with variable workloads. A change in workload associated with one task changes the optimal allocation of resources—not just for that task, but for other tasks in the cluster. Dynamic rebalancing allows for continued optimal usage over time.

A snapshot of the usage profile of various IPSes in one embodiment is shown at 9b. The market scheduler 678 is in communication with a number of individual IPSes 960a-960d. Each IPS 960 includes a number of VMs 962, with VMs 962a corresponding to IPS 960a, VMs 962b corresponding to IPS 960b, etc. The VMs 962 correspond to the logical containers and operating environments described previously. Each VM 962 has an associated usage profile graphically shown as the stacked bar graph associated with each VM. The VMs 962a-962d are respectively managed by hypervisors 964a-964d.

Associated with each IPS 960a-960d is a graphical representation of the aggregate load 966, with the load from IPS 960a being shown as the aggregate load 966a, the load from IPS 960b being shown as aggregate load 966b, etc. The aggregate loads 966a-966d represent the load from all of the VMs associated with that IPS, divided into different orthogonal types of load. In the embodiment shown in FIG. 9b, the load is divided into CPU load, I/O load, Disk load, Memory load, and Network load, but other embodiments, including embodiments discussed herein, can include other types of load.

Also shown in FIG. 9b is a nursery 970, which also contains an exemplary VM 972. The nursery can be either physical—a separate IPS from IPSes 960—or can be a marked area within IPSes 960. The exemplary VM 972 has its own load shown by the stacked bar graph, which can be used in some embodiments to assist with placement.

Figure 10:
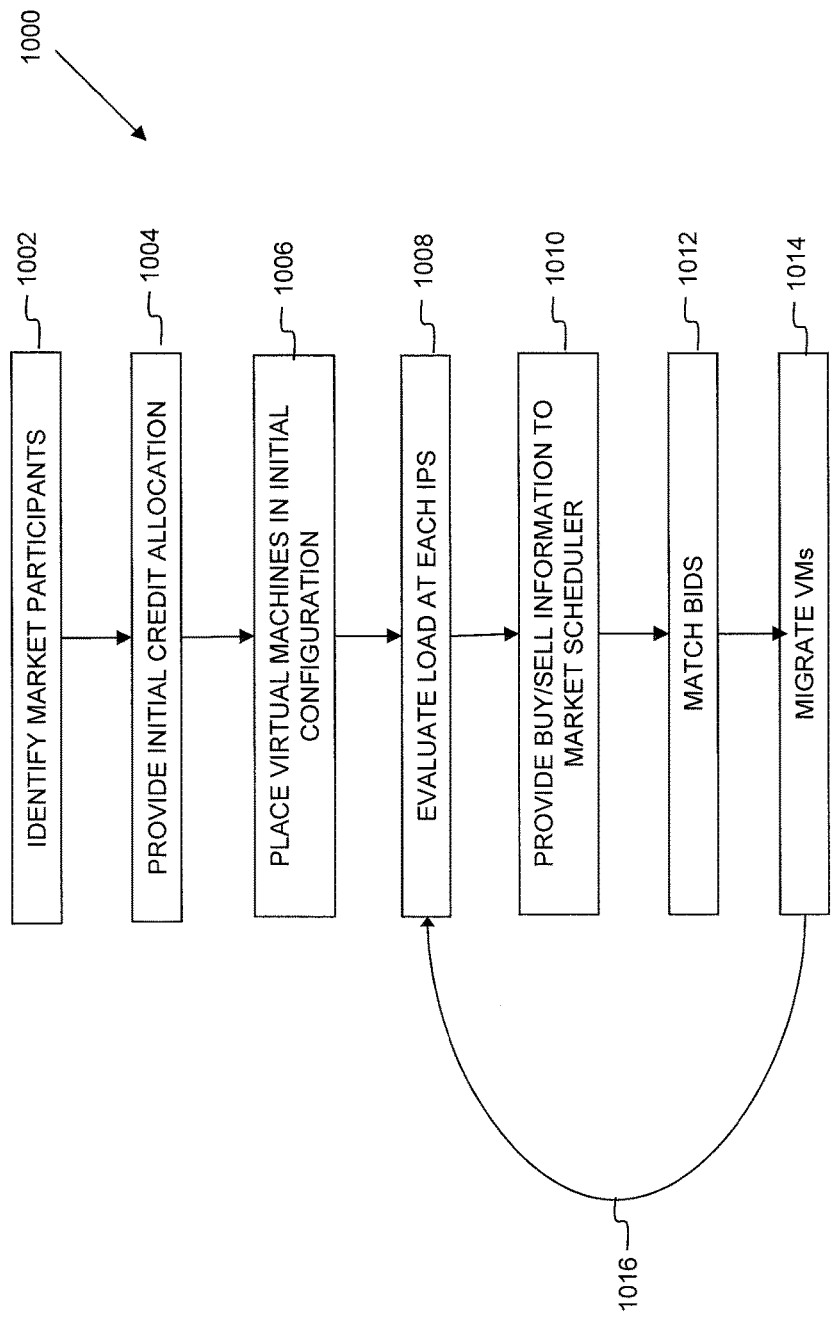
FIG. 10 illustrates a simplified flow chart for market-based allocation according to the present disclosure.

Turning now to FIG. 10, a procedure for implementing the market allocation for VMs is shown as flowchart 1000. At step 1002, the initial market participants are identified. Market participants are computational systems that can be used to manage some workload. In various embodiments, the market participants are information processing systems (IPSes) such as those shown previously in FIGS. 2, 8, and 9. Other embodiments may also have other concurrent markets with different participants, such as clusters 676a and 676b, or individual storage nodes in an object store 640. Market participants have some capacity that will be used as credit once the market is established.

Taking the infrastructure described above as available, the market allocation procedure can be formally described in two phases, an initial allocation phase and a dynamic balancing phase. The VMs (or tasks) are denoted as $V_1 \ldots V_n$, and the available information processing systems (IPSes) as nodes $N_1 \ldots N_n$. A node $N_i$ has a measured maximum capacity $C_{max}(N_i)$, where $C_{max}(N_i)$ denotes a vector of values corresponding to measurable depletable capacities, such as [P, M, T, D, I], corresponding in this embodiment to Processor task-seconds, Memory, network Traffic, Disk space, and sustained I/O operations per second. A VM $V_i$ has a measured usage profile $C(V_i)$. The total resource usage for a node at time t is given by $$C_t(N_i) = \Sum_{i=1}^n C_t(V_i)$$

These values are used to characterize a market participant, both in terms of available capacity and in terms of instant load.

At step 1004, each market participant is provided an initial credit allocation corresponding to the underlying capacity of the node $C_{max}(N_i)$. The credit allocation should be in units that are comparable across different systems and directly related to the possible workloads placed on each machine. For example, various embodiments may use CPU capacity, disk space, memory size, memory pressure, I/O operations, numbers of volumes on disk, number of accounts, network utilization (incoming or outgoing), or network proximity as the basis for initial credits. Those of skill in the art will recognize that not each type of credit will necessarily be appropriate to each type of market participant, but each type of credit should correlate with some measurement of capacity available and depletable by virtual workloads. While some embodiments may use various measurements directly as measurements of available "credit," other embodiments may use a blended credit score that represents several different types of capacity of the underlying system. A third preferred embodiment uses multiple types of credit to represent each type of underlying capacity. In at least some embodiments, the use of different types of resources allows for mutually beneficial trades of workloads. Where a blended workload score would of necessity include values for memory, CPU, I/O, etc., in the blended score, a multivariate workload allows the expression of different types of workloads (high memory, high CPU, high disk, high network) so they can be efficiently balanced. An embodiment that uses non-sharable resources (such as a graphics card or similar accelerator) can denote that as a whole number value. For example, a single non-sharable resource can be have a $C_{max}(N_i)$ of 1 and the load $C_t(N_i)$ can have the values 0 (unused) or 1 (used). Multiple resources can be represented by corresponding integer multiples. A fourth embodiment includes both "internal" and "external" values. Internal values correspond to the intrinsic capacity of the IPS. External values correspond to external resources depleted by or correlated to use of capacity on the node. For example, aggregate bandwidth, services provided by another node, IP addresses, database connections, or latency to particular gateways, services, or other nodes are all types of external values that can be included in $C_t(N_i)$ and $C_t(V_i)$. Including explicit values for external couplings or external costs allows the modeling of coordination costs and externalities (both positive and negative). In one embodiment, all values in $C_t(N_i)$ and $C_t(V_i)$ are modeled as costs associated with depletable commodities, although alternative embodiments also allow for modeling as resource requests or negative values (positive coupling for positive externalities).

At step 1006, virtual machines (or more generally, virtual workloads or tasks) are placed in an initial configuration. While this can be done either randomly, using some sort of best-fit algorithm, or according to any allocation strategy known in the art. It is important to note that the process described is tuned toward long-run steady state performance, and the initial allocation is less important. While greater initial efficiency is achieved if the initial placement is closer to optimal for the provided workload, it is expected that virtual workloads will migrate dynamically as loads change—including moving from a less-optimal original allocation to a more-optimal long-run allocation. In practice, workloads are usually added incrementally, allowing continual rebalancing.

Those of skill in the art will note that step 1006 is identical in all essential respects to a change in membership in the population of IPSes available for allocation. For example, assume that a third cluster was added to clusters 676a and 676b. The overall configuration would then shift from a balanced allocation (presumably) to one that was unbalanced due to the underutilization of the third cluster that was brought online.

Less drastic changes are also accommodated in similar fashion. If a single IPS comes online, then the nodes will still be out of balance, but to a lesser extent. The unloaded node will tend to bid higher for new or migrating workloads as described below, automatically balancing the allocation across the cluster.

At step 1008, the main loop of the market scheduler begins. Each IPS (or more generally, each market participant) individually evaluates the load placed on it by the workload it has been assigned. A workload (such as a VM in the presently-discussed embodiment) places certain demands on the underlying IPS—disk space is used for the VM disk image, memory is used for the VM processes, CPU is used doing tasks within the VM, network bandwidth is used for communication. The individual loads (for each VM) and aggregate load (for all VMs on an IPS, plus any necessary overhead from the hypervisor or other management processes) is calculated and compared to an evaluation function.

The evaluation function is designed to compare observed aggregate load against an optimal load. In one exemplary embodiment, an optimal load is defined as 75% total utilization of each individual measured element, such as 75% CPU load, 75% disk space usage, etc. While it may be possible to have different optimal loads in different measured capacities, a uniform load will be used for purposes of illustration. Those of skill in the art will also recognize that there are different ideal levels of slack for different types of resources. The slack may be needed either because the efficiency of utilization goes down as usage goes above a certain level, or it may be to accommodate unexpected spikes in usage. This would allow for soft limits on resource usage to be temporarily surpassed ("burst" usage) and would also allow for migration costs as described further below.

At step 1010, buy and sell information is provided to the market scheduler 678. If a particular market participant is within a certain range of optimal utilization as described by the evaluation function, then the IPS can decide not to send any buy/sell information to the market scheduler 678. If the evaluation function determines that the load is too high, then information about one or more VMs are provided to the market scheduler 678 for possible purchase by another market participant. If the evaluation function determines that the load is too low, then information about the available resources (the "bid") is provided to the market scheduler

678. In some embodiments, buy/sell information can also be provided to the market scheduler to rebalance a load. Each buy or sell order has an associated TTL during which it will be valid. The TTL corresponds roughly to the period between executions of the evaluation function. The periodicity of evaluation between nodes does not necessarily need to be the same. Although some embodiments may synchronize the provision of buy/sell information, one preferred embodiment has all buy/sell information being provided to the market scheduler asynchronously. This allows the coordination of arbitrary numbers of systems without the overhead and difficulty of distributed time synchronization.

At step 1012, the market scheduler makes the market, matching "offered" VM workloads with the bids. For each proposed match between a "seller" of a workload and a "buyer" of the workload, information about the proposed match made by the market scheduler 678 is provided to the two or more proposed transaction participants. In some embodiments, the market scheduler also imposes a transaction cost on each market participant, which is included in the underlying information sent to each participant. In one embodiment, this transaction cost is modeled as a cost extending over a period of time that is estimated to be proportional to the time needed to effect the transaction. This transaction cost acts as a damper on the activity of the market, making it so that marginal improvements end up "costing" more than they gain in increased utility. Each market participant evaluates the proposed information and accepts or rejects the proposed transaction (including any associated costs) based on whether the new proposed arrangement of workloads would end up leading to overall equal or greater utility. If a market participant rejects the transaction, then the transaction fails and the process resets for the next evaluation of load (at step 1008). If all the market participants accept the transaction, the process proceeds to step 1014.

In one embodiment, there are two different types of buy or sell information provided: one related to total resources and one related to best fit. These will be described relative to a bid. The total resources includes the maximum value of each resource available for a new VM:

$$B_{max}(N_i)=C_{max}(N_i)-C_t(N_i).$$

$B_{max}(N_i)$ is valuable for understanding whether a proposed task will fit on a particular node. A best-fit bid includes the difference between the load vector at time t and the optimal load:

$$B_{opt}(N_i)=C_{opt}(N_i), C_{opt}(N_i)-C_t(N_i)$$

$B_{opt}(N_i)$ is individual per IPS and is calculated relative to the target load for each value in i. Sellers can provide information relating to different VM loads that are available for transfer, as well as the distance between the ideal load $C_{opt}(N_i)$, the current load $C_t(N_i)$.

At step 1014, the individual transacting parties transfer the VMs between themselves according to the accepted transaction. This can be done using various methodologies for VM transfer available in the industry. In one embodiment, the method for transferring the VM is the method used in application Ser. No. 13/467,686, filed May 9, 2012, entitled "Wake-on-LAN and Instantiate-on-LAN in a Cloud Computing System," which provides for no-downtime transfer of virtual machine workloads between systems. Other VM migration technologies can also be used. The market scheduler 678 also sends appropriate information to the network controller so that the VLANs or virtual networks as described relative to FIGS. 4a-4c can be transparently reconfigured to route traffic to the new host with minimal packet loss.

At step 1016, the process repeats, going again to step 1008. This repetition is performed at each IPS according to its own schedule. The market allocator continuously tries to match the bids and offers it receives.

Various embodiments and extensions of the system described above will now be described in detail.

Initial Allocation of Credits

A distinctive feature of many embodiments is the initial allocation of credit to IPSes that will be market participants. Although benchmarking is not essential for an initial allocation of market "credits"—bare measurement of processor speed, RAM size, HDD size, etc can suffice for a rough approximation—one preferred embodiment uses benchmarks of various types to measure and allocate initial credit. Both virtual and physical compute workload performance is strongly influenced by performance capabilities of the underlying information processing system where the workload is executing. For example; the speed at which a compute workload can write a file to disk is based on the speed of the underlying disk, flash or other computer readable medium. The total computational workload is bounded by the speed, parallelism and temperature-based performance of the chipset and central processing unit. As described above, these are different within a cloud and, due to differences in airflow, placement, vibration, heat, and manufacturing variability, among other factors, these can even vary between apparently "identical" systems.

Initial allocation of credit along various dimensions according to measured capacity allows for variations in the underlying capability of machines to work together—and in fact, a heterogeneous pool of underlying physical hardware will in many cases result in a more efficient allocation of virtual workloads than a completely homogeneous pool.

The ability to efficiently schedule resources onto a pool of physical resources is influenced in part by the knowledge of what "full utilization" or "optimal utilization" means in different contexts. In one embodiment, various workloads and benchmarks are used to measure total capacity of a system under a variety of different scenarios. As is known in the art, benchmarks are designed to mimic a particular type of workload on a component or system. Synthetic benchmarks do this by running specially created programs that impose the workload on the component. Application benchmarks run real-world programs on the system. Although application benchmarks usually give a much better measure of real-world performance on a given system, synthetic benchmarks are useful for testing individual components, like a hard disk or networking device.

One embodiment of the market-based allocation system allocates an initial number of "credits" based upon measurement of the performance of a particular underlying system. In general, performance information—spendable "credit"—about IPS and VM instances is gathered in three phases—during boot up of an information system, during boot up of a specific VM, and during workload processing. The gathered information is provided to the local agent and, in some embodiments, to the scheduler 678 to make scheduling determinations. Although some embodiments may use a unitary "credit," where all types of processing are fungible, a preferred embodiment has multiple non-fungible (or only partly-fungible) types of "credit," including CPU, I/O capacity to disk, disk space, memory capacity, I/O capacity to memory, network bandwidth and I/O capacity to the network card.

In this embodiment, each underlying information processing system such as the systems 810 and 910 is measured relative to absolute capacity along a number of different orthogonal dimensions, including but not limited to disk capacity, disk throughput, memory size, memory bandwidth, network bandwidth, and computational capacity. These can be measured using various synthetic benchmarks known in the art that focus on or stress particular known subsystems. For example, Sisoft sells the "Sandra" benchmarking tool with independent tests for CPU/FPU speed, CPU/XMM (Multimedia) speed, multi-core efficiency, power management efficiency, GPGPU performance, filesystem performance, memory bandwidth, cache bandwidth, and network bandwidth. Other well-known benchmarks include measurements file conversion efficiency, cryptographic efficiency, disk latency, memory latency, and performance/watt of various subsystems. Standard benchmarks include SPEC (including SPECint and SPECfp), Iometer, Linpack, LAPACK, NBench, TPC, BAPCo Sysmark, and VMmark.

In a further embodiment, known "typical" workloads are used to provide better "real world" performance metrics. These are a step up from application benchmarks because they include a suite of programs working together. For example, a system can be benchmarked by executing a known series of commands to run a series of database queries, render and serve a web page, balance a network load, or do all of the above. In this embodiment, the effect of a "typical" workload can be related to a "synthetic" benchmark by monitoring the use of various subsystems while the typical workload is being executed and then relating the total amount of usage to a known measurement from a synthetic benchmark. These relations can be instantaneous at a point in time, an operating range, min/max/average, or can represent total usage over time.

In another embodiment, measurement of static capacity is done when a new physical machine is brought up. In one embodiment, one or more synthetic benchmarks are run on the hypervisor or and unloaded machine to determine measures of total system capacity along multiple dimensions. In a second embodiment, one or more "utility" virtual machines are used on bootup to execute benchmarks and measure the total capacity of a machine. A third embodiment uses both methods together to measure "bare metal" capacity and relate it to a known sequence or set of "typical" workloads as executed in utility VMs. The measured capacity would be observed by local agent 814 and recorded in registry 842.

In various embodiments, the availability of custom hardware is handled by adding additional dimensions to measured capacity. For example, the ratio of disks per core can be measured directly, or GPU capabilities can be included as a separate dimension. In other embodiments, this information is represented via a score on a related metric. For example, a high ratio of disks would show up as a high max throughput number for IOps, and the existence of GPU capacity would be represented as a higher processing score for array-based operations.

If measuring and comparing various disparate aspects of the hardware becomes difficult, then a further embodiment can group IPSes that have the similar characteristic into a performance zone and the zone information can be provided to the market scheduler directly or via a cluster registry.

Placing Machines in an Initial Configuration

One embodiment of the system for market-based allocation involves the use of a "nursery" for new virtual workloads. The nursery is a logical or physical holding pen for new workloads so that the "cost" of each workload can be measured. After measurement and scheduling by the market scheduler, the virtual workload is moved to the "best fit" IPS chosen by the scheduler. Several different implementations of the nursery are anticipated for various embodiments.

A first implementation of the nursery is as a physically separate pool of machines, chosen so that there are candidate IPSes in the nursery embodying the various separate aspects available in the heterogeneous group of IPSes available in a cluster. For example, various IPSes would include GPU capability, high I/O capability, high processor capability, etc. In this embodiment, the nursery IPSes include some of the most highly-specified machines available in a cluster. This allows the accurate placement of high-cost workloads (which cannot be placed on lesser machines) and allows for initial high performance during the initial measurement phase.

A second implementation of the nursery uses individual IPSes that are not segregated out into a particular pool, but instead are chosen from the population of IPSes as a whole. For example, each set of IPSes shown in FIG. 9*b* could have some number or percentage of systems set apart as nursery machines. In one implementation, the "nursery" is simply another zone. Because zones can overlap, different performance zones are represented within the population of the nursery zone.

A third implementation uses a virtual tagging system. New virtual workloads are assigned according to an algorithm and tagged as being part of the "nursery." In this implementation, the initial assignment could be random or it could use existing heuristics to determine a best-guess fit. When a machine was moved from the nursery, one possible result would be simply the removal of the "nursery" tag from the virtual workload.

Those of skill in the art will note that a nursery is not necessary to the functioning of various embodiments. In particular, a nurseryless implementation would use a random or best-guess placement for new virtual workloads and would use the market scheduler for ongoing adaptive tuning of the workloads as described below. Either way, the ongoing adaptive allocation performed by market scheduler 678 is done using direct measurement of virtual workloads so that perfect (or close to perfect) information is available in the market.

Initial Placement of a Virtual Machine

Figure 11:
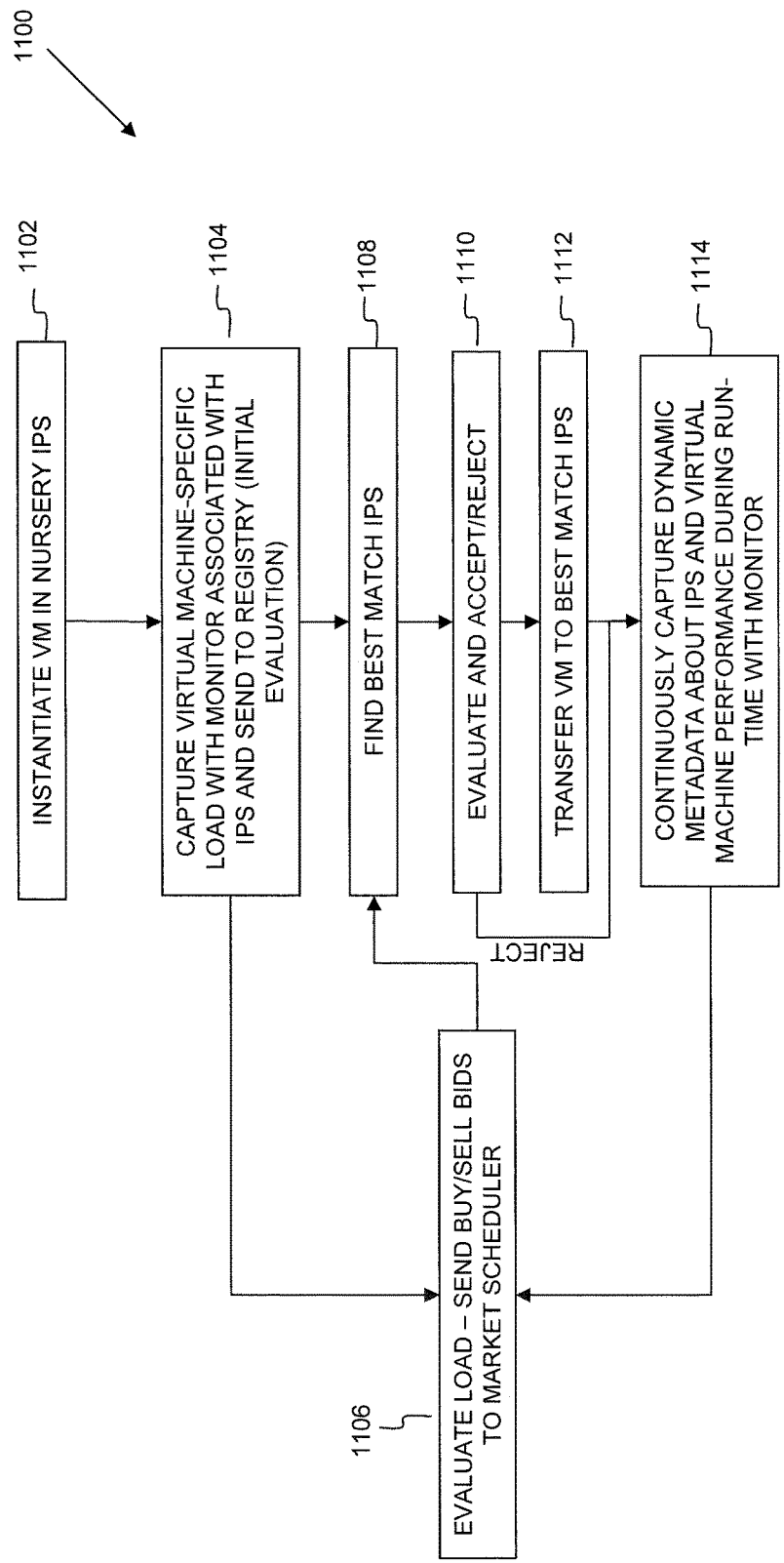
FIG. 11 illustrates is a system that includes a plurality of compute clusters and availability zones defined within the compute clusters.

FIG. 11 provides a flowchart showing the process for the initial allocation of virtual machines to the available IPS. At step 1102, the virtual machine is instantiated in a "nursery" IPS. The method next proceeds to block 1104 where the monitor captures virtual machine specific load information. For example, the monitor may collect the virtual hardware configuration of the VM and perform some initial bandwidth and latency tests to collect network statistics as they appear from "inside" of the virtual machine. Thus, the VM performance and load information collected in block 1104 may include both static and dynamic metadata. As the VM performance information is collected, it is evaluated in light of the utility function for the IPS and buy/sell bids are transmitted to market scheduler 678, as shown in block 1106. As the performance information describing various VMs instantiations executing in one or more compute clusters is made available to the market scheduler, the scheduler is operable to match running VMs to their best fit IPS host based on virtual hardware capabilities and network load and latency as they appear to the running VMs, as shown in block 1108. The procedure for performing this best fit match is detailed below. At step 1110, each proposed match is sent back to the evaluation system at each IPS. The IPS can evaluate each match and accept or reject them in a way that maximizes the utility function. If all proposed matches are rejected, the method moves to step 1114. Otherwise, at step 1112, the VM is transferred to the "best fit" IPS host using the VM transfer procedures outlined in co-pending application Ser. No. 13/467,686, filed May 9, 2012, entitled "Wake-on-LAN and Instantiate-on-LAN in a Cloud Computing System," and using the additional procedures described herein. Next, the method proceeds to block 1114, where the hypervisor or a monitor associated with the hypervisor continuously captures dynamic performance information describing the operational state of the information processing system and VM instance throughout the life cycle of each. For instance, the monitor may capture disk activity, processor utilization, bandwidth, and special feature usage of both the information processing system and, where applicable, the VM instance. Again, as the metadata is collected, it is continuously sent to the local agent and the market scheduler so that it may be made available to the scheduler in block 1106. With the few exceptions described below, the local agent uses this information to make on-the-fly updated scheduling decisions in concert with the market scheduler.

Evaluation of Load

In one exemplary embodiment, the evaluation of the load is done using a fuzzy logic function evaluating overall utility of the present workload from the perspective of the IPS. Overall utility for each measured element is evaluated relative to a normal distribution centering around the provided optimal point (in this example, 75% utilization). This allows minor fluctuations from the optimal point to still provide substantial utility, but have increasing variance from the desired utilization (either higher or lower) to be interpreted as providing less overall utility. In an embodiment where multiple types of credits are used, the overall utility can be modeled as a sum of the underlying distributions. When the underlying distribution (or sum of distributions) can be discretized using its own distribution, with a particular threshold being used to identify whether the existing allocation of VMs (workloads) to the IPS is considered overall acceptable or not. For clarity only, one possible threshold is 0.75, where an overall utility score higher than 0.75 would indicate that no change to the workload is warranted, and lower that 0.75 indicating that the IPS should participate in the market to reallocate the workload.

In a further embodiment, each VM can have its own utility function based upon what was purchased for use. In this embodiment, each VM evaluates its own utilization, both in terms of soft and hard limits, and can have a utility function with a different distribution than the utility function for the IPS as a whole. The individual VMs can also evaluate whether their individual percentage of the IPS's resources are being effectively utilized relative to an idealized percentage of the IPS's resources used under a non-virtualized load. This can give an overall "happiness" or "utility" for each VM as well.

In an embodiment that uses multiple types of credits, the process of determining what workloads to buy or sell is can be performed to optimize across the various underlying types of loads. For example, if the overall distribution indicates that some load should be sold, then the different actual workloads can be analyzed to determine what is the best outcome. In one example, there are five different types of credits (CPU, I/O, DISK, MEM, and NET) and each one has an associated utilization and an associated utility function. Because different VMs have different workloads, it is possible to accommodate a first VM with high CPU and low I/O concurrently with a VM that has low CPU but high I/O because there is not resource contention between the two—the different requests allow them to share resources. If two different VMs have started to use the same resource, though, such as both using CPU-intensive loads, then it may increase overall utility to offer one for sale.

Figure 12:
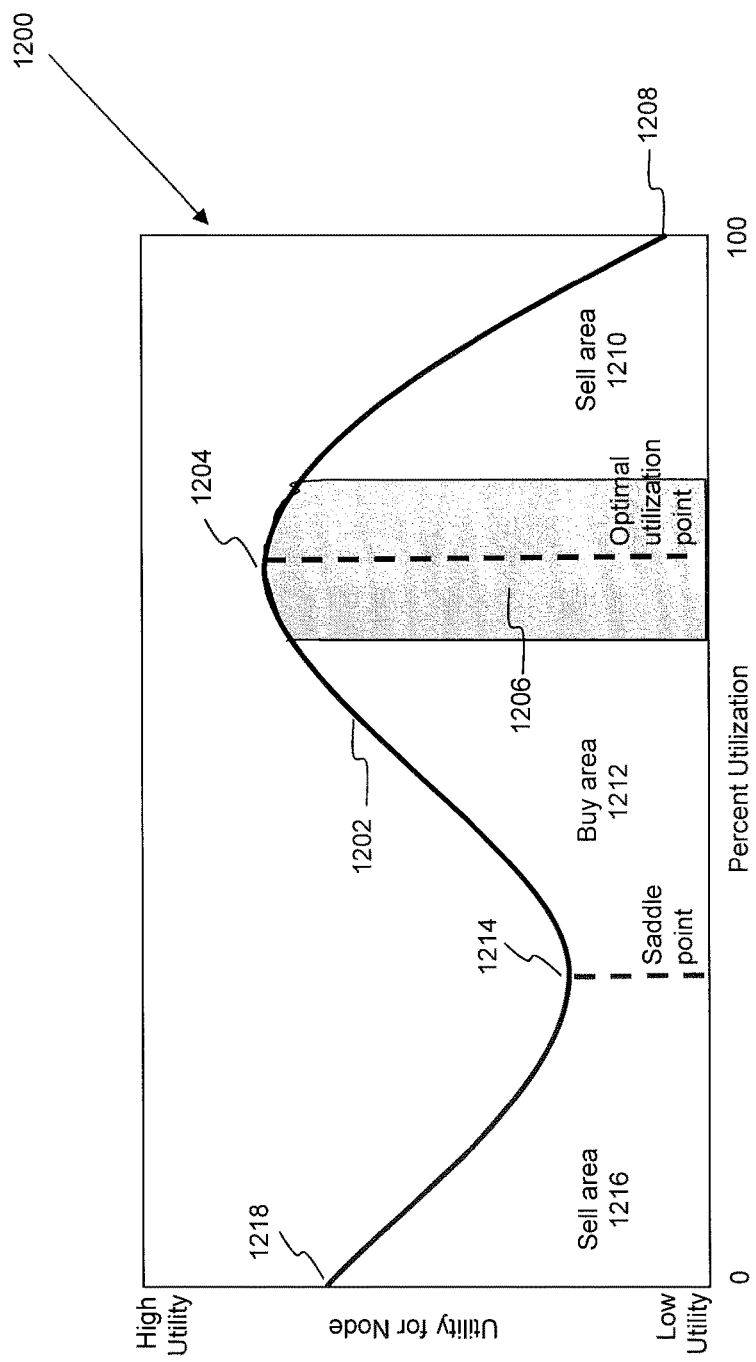
FIG. 12 is an exemplary utility function, according to an embodiment.

An exemplary utility function according is shown in FIG. 12. The utility function is shown generally at 1200, with increasing utilization on the x axis and increasing utility on the y axis. The line 1202 visually depicts the utility function according to one embodiment. For the function 1202, peak utility is at point 1204, corresponding for function 1202 to 75% utilization. Different functions may have peaks at different places. Utilization around the peak point—shown graphically as the shaded area 1206—provides almost as much utility. Having a very minor falloff around the peak point allows near-but-not-optimal loads to be maintained rather than resulting in excessive shuffling of loads trying to achieve perfect utilization on every node. Utility falls off substantially as the IPS becomes either overloaded or underloaded, so that the default action becomes to sell load (area 1210) or to buy load (area 1212) so as to move the system as a whole moves closer to optimal point 1204. The lowest overall utility is a point 1208, 100% utilization, because that point offers the worst possible customer experience. In this embodiment, the point 1214 is the point where it is more efficient to sell the load necessary to move the entire IPS to 0% utilization (point 1218). At lower load than point 1214, the system incentivizes either a) large purchases to move the utilization into area 1212, or b) sales of load to move the IPS as a whole closer to 0% utilization. The closer to 0% utilization the IPS moves, the more incentivized the system is to sell capacity and become completely idle. In this embodiment, the slope from the saddle point at 1214 up to the optimal utilization point 1204 is steeper than the slope from 1214 up to the zero utilization point at 1218. This means that there is a bias toward utilization, and given the choice of whether to buy or sell a load, it tends to be more optimal to move toward higher utilization. Saddle point 1214 is specific to this embodiment; other embodiments use a function increasing utility from 0% utilization up to optimal utilization.

Providing Buy/Sell Information

When choosing which VMs to provide to the market scheduler 678 for reallocation, there are several strategies. The first strategy is to "sell" the highest-cost VMs, so that the remainder of the VMs have additional capacity. This has the advantage of having a low transaction cost (fewer VMs to move) to achieve a good result. On the other hand, that may also free up too much capacity (leading to underutilization) or impose a higher transaction cost owing to heavy use—VMs in use may "cost" more to move in terms of synchronization overhead. A second strategy is to sell lower-cost VMs to bring down utilization so that the high-cost VMs have enough resources to fit within the optimal allocation. This has the benefit of being more fine-grained, as the VM workloads move in smaller increments. It also has the advantage that lower-cost VMs are by definition being used less, so there is less chance of a service disruption. On the other hand, there may be higher transaction costs associated with moving multiple VMs. A final strategy is to move the "unhappiest" VMs, by ranking them in reverse order according to their internal utility functions. The unhappiest VMs have the largest current disruption and the most to gain from a change.

There is nothing to prevent a single IPS from submitting multiple, and even contradictory orders. For example, an overloaded node may offer for sale the load for each hosted VM individually. In another embodiment, an IPS with a utility function similar to function 1202 in FIG. 12 may offer to either buy capacity or to sell capacity if it is near saddle point 1214—either action would increase utility. If multiple contracts are accepted, the IPS can decide to fulfill all the contracts or some subset thereof. If a contract is refused then it is as if there were no suitable bidder or seller for the offered load.

In a preferred embodiment, all three of these strategies are used, as no single strategy dominates all situations. Finally, those of skill in the art will recognize that while the IPS is attempting to evaluate and optimize its own situation, it may also be useful to provide extra information to the market scheduler 678, even if no particular VM is due to be sold or clearly the best one to be sold; the scheduler 678 is able to propose matches and the IPS will later be able to accept or reject them as required.

When presenting buy information to the market scheduler 678, the information that is provided is the amount of credit that the market participant can dedicate to one or more new virtual workloads. In one embodiment, this is a list of the available spare capacity according to each type of "credit." This can be accompanied by a distribution (or top prices) so that workloads that almost fit but would result in slight overutilization can also be considered. Finally, in one embodiment, buy information is also presented along with current costs for existing VM workloads so that multi-party transactions can be evaluated and proposed by market scheduler 678.

Matching Bids

In one embodiment, the bid matching process is performed as a series of auctions, with the highest "bids" being matched against the highest-cost workloads first. The various costs can be considered as a multivariate optimization problem, trying to find the best matches between offered workloads and available capacity. In many embodiments, it will be more important to have a rapid evaluation than a perfect one, as the evaluation process is repeated.

Various different embodiments may be used either separately or together. In the first embodiment, exact matches (or matches that are "exact" within a fuzzy tolerance) are brought together. All other bids are rejected. This allows any situations where a buy or sale offer will move an accepting node to $C_{opt}(N_i)$ to be accepted and executed first.

In one embodiment, the market scheduler 678 utilizes a rules engine 1140 that includes a series of associated rules regarding costs and weights associated with desired compute node characteristics. When deciding where to instantiate a VM instance, rules engine 1140 calculates a weighted cost associated with selecting each available IPS in turn and calculating a match score, with a "cost" defined as the non-optimality of the match. In one embodiment, the weighted cost is the sum of the costs associated with various requirements of a VM instance. The cost of selecting a specific information processing system is computed by looking at the various capabilities of the system relative to the specifications of the instance being instantiated. The costs are calculated so that a "good" match has lower cost than a "bad" match, where the relative goodness of a match is determined by how closely the available resources match the requested specifications.

One embodiment can use a multidimensional distance algorithm to calculate the weight between various bid and sell vectors. By mapping the vectors into a multidimensional space, the cosine of the angles between the two vectors can be evaluated using the dot product. This can provide a distance value comparable between different buy and sell vectors. Optimal vectors can be evaluated first, followed by total available vectors. If hard requirements are included, then bids not matching hard requirements can be excluded so that the total search space is reduced.

In an embodiment using both internal and external costs, external costs can be either computed directly and used as part of the matching function, internalizing the externalities represented by the external cost vector, or they can be used as a tie-breaker for deciding between equal or closely-equivalent bids.

A further embodiment uses the information gathered by the market scheduler to optimize the performance of a cluster of IPSes as a whole. This can be done through at least two mechanisms. First, the market scheduler can provide "incentives" in the form of external cost discounts to influence the selection (or rejection) of particular loads. In one embodiment, this is done by not including a "tax"—an arbitrary cost added on as a damping factor—on particular favored workloads. In another embodiment, the market scheduler communicates with an individual node and adjusts to evaluation function for one or more individual nodes, such as function 1202 in FIG. 12. By adjusting the criteria that individual nodes use to decide whether to buy or sell load, individual IPSes or clusters as a whole can be moved to higher or lower utilization levels. In various embodiments, evaluation functions are modified by adjusting the peak utilization point 1204 for a particular commodity higher or lower, by changing the slope of the curve within the optimal utilization area 1206, by lowering, moving, or removing saddle point 1214, or by allowing for 100% utilization by moving 100% utilization point 1208 so that there was no decrease (or a smaller decrease) in utility for 100% utilization. Those of skill in the art will note that different commodities will have different optimal utilization curves, and different measurements can go into the calculation of utility at a particular utilization level. For example, a network utilization curve may measure latency of response as well as total throughput. A high throughput profile with high latency may or may not be "optimal" depending on what the requirements for a particular application may be.

In one embodiment, VM instantiation requirements may be hierarchical, and can include both hard and soft constraints. A hard constraint is a constraint that must be met by a selected information processing system. In one embodiment, hard constraints may be modeled as infinite-cost requirements. A soft constraint is a constraint that is preferable, but not required. Different soft constraints may have different weights, so that fulfilling one soft constraint may be more cost-effective than another. Further, constraints can take on a range of values, where a good match can be found where the available resource is close, but not identical, to the requested specification. Constraints may also be conditional, such that constraint A is a hard constraint or high-cost constraint if constraint B is also fulfilled, but can be low-cost if constraint C is fulfilled.

As is understood by one of ordinary skill in the art, different compute jobs may require different types of calculations that are more efficiently computed on different types of hardware. For instance, a graphics-intensive compute job may be most efficiently completed on an information processing system that includes a GPU accelerator card. Certain portions of the sell vector may be considered to be hard requirements, requiring matching bid vectors on those capacities to match. With this requirement, the scheduler will only offer GPU-requiring workloads to appropriate processing systems, even though there is no central registry of GPU-containing IPSes. This strategy can be applied to other requirements, such as a node that can run specific operating system instances.

As implemented in one embodiment, the external costs can also be considered as rules with associated cost functions. The rules engine 1140 may store and apply the rules to scheduling determination made by the scheduler 678. These rules can be abstract, such as preferring nodes that don't already have an existing instance from the same project or group. Other constraints (hard or soft), may include: a node with minimum network bandwidth to another network location or a node in a particular geographic location, etc.

In one embodiment, market manipulation, whether by changing "taxes," external costs, or by changing utility functions, is used to optimize the overall cost structure of the cluster operations. For example, in one embodiment the market scheduler 678 notes that the average utilization of a cluster (as reported by the various IPSes buying or selling load) is below an optimal target for the target. This equates to real costs (in terms of electricity, heat load, etc.) that are imposed on the cloud provider. By observing the bids that come in, market scheduler 678 is operable to dynamically monitor changes in cloud resources—as viewed from a global perspective and from within individual VMs—and optimize the cost of running the cloud system or use the bids as input to identify datacenter management operations.

In one embodiment, the market scheduler 678 monitors the average bids, defined either according to the maximum or average bids ($B_{ave}$):

$$B_{average\text{-}max} = \frac{\sum_{i=1}^{n} B_{max}(N_i)}{n}$$

$$B_{average\text{-}opt} = \frac{\sum_{i=1}^{n} B_{opt}(N_i)}{n}$$

When $B_{ave}$ drops below a certain level, then that is a signal that the datacenter needs new IPSes or clusters to make available to the system. In a second embodiment, the $B_{ave}$ for individual commodities is monitored to similarly identify and react to approaching resource shortages—in disk space, network bandwidth, or in more discrete items such as the total number of tasks requested for use with special hardware like a solid state drive or GPU.

In another embodiment, IPMI sensor data can be reported as well to correlate environmental information and heat load with specific levels of utilization, triggering changes in cooling in a datacenter so as to keep the computers in a target temperature zone. During the initial benchmarking phase, an optimal efficiency band can be computed where one or more usage characteristics can be optimized on a per/watt basis. Bids for load can be modified by including information about the physical/thermal load of the system in the bid. In one example, an individual node can have a separate evaluation function that puts optimal utilization for the system at the point where the additional causes an increase in fan speed greater than 30% of maximum. In this way, the market scheduler 678 can be tuned to individually optimize the efficiency of the information processing system 1110 actually running the workload.

In a second embodiment, monitoring $B_{ave}$ where bids include physical information such as heat load allows environmental conditions (and ultimately, costs) to be controlled and optimized across individual racks and the whole datacenter using the same market operations discussed herein.

In another embodiment, the observation of increased $B_{ave}$ corresponds to lower utilization. Individual racks or computers in the datacenter can be targeted for shutdown. In order to make the experience seamless for tenants in the VMs, the market scheduler can change the evaluation function or tax/cost structure for those IPSes that are targeted for shutdown, letting them clear by the action of the market before shutdown occurs.

In another embodiment, individual nodes may develop issues where they are functional but not working to standard. An observation of bids from individual nodes, rather than average bids, can identify "trouble nodes" that have lower average performance than comparable IPSes. These trouble nodes can be cleared using the market manipulations described herein and targeted for refurbishment or removal.

Even though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A market scheduler in a cloud computing environment, comprising:
    a memory containing a non-transitory machine-readable medium comprising machine executable code having stored thereon instructions for performing a method of distributing virtual machines to a plurality of remote systems; and
    a processor coupled to the memory, the processor configured to execute the machine executable code to cause the processor to:
        receive a first plurality of buy and sell messages from the plurality of remote systems, wherein buy messages include an indication of resources available for use on a buying remote system in the plurality of remote systems, and wherein sell messages include an indication of resources used by a virtual machine operating on a selling remote system in the plurality of remote systems;
        match the buy messages with the sell messages, wherein the difference between resources available for use in the buy messages and the resources used is minimized; and
        send a second plurality of bought and sold messages to the plurality of remote systems, a bought message corresponding to a buy message received in the first plurality of buy and sell messages from a first remote system that matched with a sold message corresponding to a sell message received in the first plurality of buy and sell messages from a second remote system, wherein the sell message includes a highest bid and the buy message includes a highest-cost workload of the first plurality of buy and sell messages, and wherein based on the bought message and the sold message the second remote system transfers the virtual machine to the first remote system.

2. The market scheduler of claim 1, wherein the processor is further configured to modify the bought and sold messages to reflect a transitory cost associated with executing a buy or sell operation.

3. The market scheduler of claim 1, wherein the processor is further configured to monitor an average utilization by averaging values reported in buy and sell messages.

4. The market scheduler of claim 1, wherein the processor is further configured to optimize performance of the plurality of remote systems by changing a utility function used by one or more remote systems to evaluate buy and sell messages.

5. The market scheduler of claim 1, wherein the resources include at least one of the processor, the memory, a hard disk, or a graphics processing unit (GPU) accelerator.

6. The market scheduler of claim 1, wherein the first remote system is associated with a first agent that is local to the first remote system, and the first agent associated with the first remote system gathers information about the first remote system and includes the information in the buy message.

7. The market scheduler of claim 6, wherein the processor is further configured to communicate with
the first agent regarding information associated with one or more virtual machines running on the first remote system.

8. The market scheduler of claim 6, wherein the first remote system determines a maximum value for one or more of the resources available to a new virtual machine.

9. The market scheduler of claim 1, wherein the first remote system is provided an initial credit allocation corresponding to an underlying capacity of the first remote system, and wherein the initial credit allocation is in units comparable across the plurality of remote systems.

10. The market scheduler of claim 9, wherein the initial credit allocation is directly related to possible workloads placed on the first remote system, and is included in the buy message.

11. The market scheduler of claim 9, wherein at least one of CPU capacity, disk space, memory size, memory pressure, I/O operations, number of volumes on disk, number of accounts, network utilization, or network proximity are used as a basis for the initial credit allocation.

12. The market scheduler of claim 9, wherein the first remote system is provided a second initial credit allocation corresponding to an underlying capacity of the first remote system, and wherein the second initial credit allocation is different from the initial credit allocation and is included in the buy message.

13. The market scheduler of claim 1, wherein the second remote system identifies a highest-cost virtual machine running on the second remote system, and includes an offer to sell the highest-cost virtual machine in the sell message.

14. The market scheduler of claim 1, wherein the second remote system identifies a first virtual machine having a lower cost than a second virtual machine running on the second remote system, and includes an offer to sell the first virtual machine in the sell message.

15. The market scheduler of claim 1, wherein the first remote system uses first criteria to decide whether to buy a load, and the processor is further configured to:
adjust the first criteria to increase resource utilization of the first remote system.

16. The market scheduler of claim 1, wherein the second remote system uses second criteria to decide whether to sell a load, and the processor is further configured to:
adjust the second criteria to increase resource utilization of the second remote system.

17. The market scheduler of claim 2, wherein the transitory cost includes a cost extending over a period of time that is estimated as being proportional to a time needed to effect a transaction for executing a matched buy and sell message.

18. The market scheduler of claim 17, wherein the second plurality of bought and sold messages includes the transitory cost, and each of the first and second remote systems evaluates the transitory cost to determine whether to accept or reject the transaction.

19. The market scheduler of claim 18, wherein the first remote system determines whether to accept or reject the transaction based on whether the transaction would lead to overall equal or greater utility for the first remote system, and wherein the second remote system determines whether to accept or reject the transaction based on whether the transaction would lead to overall equal or greater utility for the second remote system.

20. A market scheduler in a cloud computing environment, comprising:
a memory containing a non-transitory machine-readable medium comprising machine executable code having stored thereon instructions for performing a method of distributing virtual machines to a plurality of remote systems; and
a processor coupled to the memory, the processor configured to execute the machine executable code to cause the processor to:
receive a first plurality of buy and sell messages from the plurality of remote systems, wherein buy messages include an indication of resources available for use on a buying remote system in the plurality of remote systems, and wherein sell messages include an indication of resources used by a virtual machine operating on a selling remote system in the plurality of remote systems;
match the buy messages with the sell messages, wherein the difference between the resources available for use in the buy messages and the resources used is minimized;
generate a second plurality of bought and sold messages, a bought message corresponding to a buy message received in the first plurality of buy and sell messages from a first remote system that matched with a sold message corresponding to a sell message received in the first plurality of buy and sell messages from a second remote system;
modify the bought and sold messages to reflect a transitory cost associated with executing a buy or sell operation, wherein the transitory cost includes a cost extending over a period of time that is estimated as being proportional to a time needed to effect a transaction for executing a matched buy and sell message; and
send the second plurality of bought and sold message to the plurality of remote systems, wherein based on the bought message and the sold message the second remote system transfers the virtual machine to the first remote system, and
wherein the second plurality of bought and sold messages includes the transitory cost, and each of the first and second remote systems evaluate the transitory cost to determine whether to accept or reject the transaction and
wherein the first remote system determines whether to accept or reject the transaction based on whether the transaction would lead to overall equal or greater utility for the first remote system, and wherein the second remote system determines whether to accept or reject the transaction based on whether the transaction would lead to overall equal or greater utility for the second remote system.

* * * * *